US012513811B2

(12) United States Patent
Arita

(10) Patent No.: US 12,513,811 B2
(45) Date of Patent: Dec. 30, 2025

(54) ACTIVE GAS GENERATION APPARATUS

(71) Applicant: TOSHIBA MITSUBISHI-ELECTRIC INDUSTRIAL SYSTEMS CORPORATION, Tokyo (JP)

(72) Inventor: Ren Arita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 46 days.

(21) Appl. No.: 18/711,758

(22) PCT Filed: Oct. 20, 2022

(86) PCT No.: PCT/JP2022/039029
§ 371 (c)(1),
(2) Date: May 20, 2024

(87) PCT Pub. No.: WO2024/084640
PCT Pub. Date: Apr. 25, 2024

(65) Prior Publication Data
US 2025/0016904 A1 Jan. 9, 2025

(51) Int. Cl.
*H05H 1/24* (2006.01)

(52) U.S. Cl.
CPC .......... *H05H 1/2418* (2021.05)

(58) Field of Classification Search
CPC .......... H05H 1/2418
See application file for complete search history.

(56) References Cited

U.S. PATENT DOCUMENTS 8,034,213 B2 * 10/2011 Matsumoto .......... H01J 37/32091 156/345.47
8,888,950 B2 * 11/2014 Lee .......... H01L 21/68735 156/345.43
11,032,899 B2 * 6/2021 Uchida .......... H01J 37/32926
(Continued)

FOREIGN PATENT DOCUMENTS

EP 4418826 A1 * 8/2024 .......... H05H 1/2406
JP 2016038940 A * 3/2016
(Continued)

OTHER PUBLICATIONS

U.S. Appl. No. 18/868,181, filed Nov. 22, 2024, Ren Arita.
(Continued)

*Primary Examiner* — Adam D Houston
(74) *Attorney, Agent, or Firm* — XSENSUS LLP

(57) ABSTRACT

In an electrode unit of an active gas generation apparatus according to the present disclosure, a dielectric film support member includes a support surface supporting a high voltage side dielectric film from a lower side. A lower surface of the dielectric film suppression member provided on an upper side of a ground side dielectric film includes a dielectric contact region overlapped with a peripheral region of the high voltage side dielectric film and the support surface of the dielectric film support member in a plan view and a dielectric non-contact region overlapped with an intermediate region of the high voltage side dielectric film in a plan view. The high voltage side dielectric film is suppressed from the dielectric contact region on an upper side by the dielectric film suppression member receiving suppress strength of a plurality of suppression auxiliary members.

8 Claims, 27 Drawing Sheets

(56) References Cited

U.S. PATENT DOCUMENTS

| | | | | |
|---|---|---|---|---|
| 11,839,014 | B2 * | 12/2023 | Watanabe | H01J 37/32348 |
| 11,942,310 | B2 * | 3/2024 | Arita | H05H 1/2418 |
| 12,074,012 | B2 * | 8/2024 | Watanabe | H01J 37/3244 |
| 12,219,688 | B2 * | 2/2025 | Hiraoka | H05H 1/245 |
| 2016/0118224 | A1 * | 4/2016 | Kohno | H01J 37/32944<br>118/723 R |
| 2020/0343078 | A1 * | 10/2020 | Watanabe | C23C 16/50 |
| 2021/0057192 | A1 * | 2/2021 | Arita | H01J 37/32357 |
| 2022/0046781 | A1 * | 2/2022 | Watanabe | H01J 37/32541 |
| 2022/0059322 | A1 * | 2/2022 | Arita | H01J 37/32541 |
| 2022/0084796 | A1 * | 3/2022 | Truong | H01J 37/32568 |
| 2023/0013017 | A1 * | 1/2023 | Arita | H01J 37/32568 |
| 2023/0025809 | A1 * | 1/2023 | Arita | H01J 37/32348 |
| 2023/0167553 | A1 * | 6/2023 | Iwai | H01J 37/32917<br>118/728 |
| 2024/0062994 | A1 * | 2/2024 | Watanabe | H05H 1/24 |
| 2024/0071730 | A1 * | 2/2024 | Hirayama | H01J 37/32623 |
| 2024/0297024 | A1 * | 9/2024 | Arita | H01J 37/3244 |
| 2025/0016904 | A1 * | 1/2025 | Arita | H01J 37/3244 |
| 2025/0191891 | A1 * | 6/2025 | Hirayama | H01L 21/2015 |

FOREIGN PATENT DOCUMENTS

| | | | | |
|---|---|---|---|---|
| WO | 2019/138456 A1 | | 7/2019 | |
| WO | WO-2021095120 A1 | * | 5/2021 | H01J 37/32568 |
| WO | WO-2021171462 A1 | * | 9/2021 | H01J 37/32568 |
| WO | WO-2024084640 A1 | * | 4/2024 | H05H 1/2406 |

OTHER PUBLICATIONS

International Search Report and Written Opinion mailed on Nov. 29, 2022, received for International Application No. PCT/JP2022/039029 filed on Oct. 20, 2022, 8 pages including English Translation.

* cited by examiner

ACTIVE GAS GENERATION APPARATUS

CROSS-REFERENCE TO RELATED APPLICATION

This application is a national stage application, pursuant to 35 U.S.C. § 371, of International Patent Application No. PCT/JP2022/039029, filed Oct. 20, 2022, the entire contents of which are incorporated herein by reference.

TECHNICAL FIELD

The present disclosure relates to an active gas generation apparatus having a parallel plate type electrode structure and generating active gas using dielectric barrier discharge.

BACKGROUND ART

In a conventional active gas generation apparatus with a parallel plate type electrode structure in which a dielectric barrier discharge is adopted, a gap between a metal electrode (electrode conductive film) and a dielectric film (electrode dielectric film) facing each other or a gap between dielectric films facing each other serves as a discharge space.

Adopted to the conventional active gas generation apparatus is a parallel plate type dielectric barrier discharge in which a dielectric barrier discharge is generated in a discharge space, and material gas injected in the discharge space is activated to generate the active gas.

For example, an active gas generation apparatus disclosed in Patent Document 1 is an example of an active gas generation apparatus in which the parallel plate type dielectric barrier discharge is adopted.

The active gas generally has a short lifetime as active gas (a period of time during which the active gas keeps high reactivity), thus the active gas needs to be supplied to a space where the active gas is to be used in a short time. The active gas is also inactivated when colliding with the other material, thus it is not preferable to supply the active gas to a space where the active gas is used through a meandering pipe, for example.

Thus, when a processed object (an object onto which the active gas is blown) is large in a space where the active gas is used, a first improvement structure of providing a gas ejecting hole for supplying the active gas to the space where the active gas is to be used and a second improvement structure including a plurality of discharge spaces corresponding to a plurality of gas ejecting holes, respectively.

PRIOR ART DOCUMENTS

Patent Document(s)

Patent Document 1: International Publication No. 2019/138456

SUMMARY

Problem to be Solved by the Invention

A method of providing a plurality of through holes in one dielectric film is adopted to the first improvement structure described above. Accordingly, the first improvement structure has a problem that a size of the dielectric film needs to be increased in accordance with the processed object, and a size of an apparatus configuration increases.

In addition, the first improvement structure also has a problem that there is no mechanism of removing heat generated by discharge, and the dielectric film is broken by heat generation by the discharge.

The second improvement structure described above has a problem that a size of an apparatus configuration increases by reason that the plurality of discharge spaces need to be provided.

In the active gas generation apparatus disclosed in Patent Document 1, when differential pressure is applied to the dielectric film, measures such as increase in a thickness of the dielectric film are necessary, and when the thickness of the dielectric film is increased, necessary applied voltage increases. When the applied voltage is increases, there is a problem that measures against insulation breakdown of an unnecessary portion and steps of increasing a size of an introduced terminal are necessary to deal with high voltage.

In addition, the conventional active gas generation apparatus disclosed in Patent Document 1 has a problem that it has less cooling efficiency by reason that the dielectric film is cooled by purge gas. Because, the conventional active gas generation apparatus has a low heat removal ratio due to air cooling.

The present disclosure is to solve the above problems, and an object of the present disclosure is to provide an active gas generation apparatus having a structure of preventing insulation breakdown of at least a dielectric film.

Means to Solve the Problem

An active gas generation apparatus according to the present disclosure is an active gas generation apparatus activating material gas supplied to a discharge space to generate active gas, comprising: an electrode unit; and a chassis housing the electrode unit in a chassis space and having conductivity, wherein the chassis includes a chassis bottom part including a flat surface and a conductor housing space concaved from the flat surface in a depth direction, the electrode unit includes: a first electrode constituting part; a second electrode constituting part provided on a lower side of the first electrode constituting part; and a reference potential conductor provided on a lower side of the second electrode constituting part and housed in the conductor housing space, the first electrode constituting part includes a first electrode dielectric film and a first electrode conductive film formed on an upper surface of the first electrode dielectric film, the second electrode constituting part includes a second electrode dielectric film and a second electrode conductive film formed on a lower surface of the second electrode dielectric film, the reference potential conductor includes an active gas buffer space on an upper portion, the second electrode constituting part is disposed to cover the active gas buffer space, the second electrode dielectric film includes a dielectric through port passing through the second electrode dielectric film in a region overlapped with the active gas buffer space in a plan view, the second electrode conductive film includes a conductive film opening part in a region overlapped with the active gas buffer space in a plan view, the conductive film opening part is overlapped with the dielectric through port in a plan view, the chassis bottom part includes a gas flow path receiving material gas from an outer portion, a material gas flow space is provided between the reference potential conductor and the conductor housing space of the chassis, a space where the first electrode dielectric film and the second electrode dielectric film face each other is defined as a main dielectric space, the discharge space includes a main discharge space as a region in which the first and second electrode conductive films are overlapped with each other in a plan view in the main dielectric space, material gas is introduced into the discharge space via the gas flow path and the material gas flow space, alternating-current voltage is applied to the first electrode conductive film, the second electrode conductive film is set to have reference potential via the chassis and the reference potential conductor, the active gas generation apparatus further includes: a dielectric film support member provided on the flat surface of the chassis and including a support surface supporting the first electrode dielectric film from a lower side; and a dielectric film suppression member for suppressing the first electrode dielectric film from an upper side, the dielectric film suppression member not being overlapped with the first electrode conductive film in a plan view, a lower surface of the dielectric film suppression member includes a dielectric contact region having contact with an upper surface of the first electrode dielectric film and a dielectric non-contact region not having contact with an upper surface of the first electrode dielectric film, the dielectric contact region is overlapped with a peripheral region of the first electrode dielectric film and the support surface of the dielectric film support member in a plan view, the dielectric non-contact region is overlapped with an intermediate region of the first electrode dielectric film in a plan view, the intermediate region is a region adjacent to a side of the first electrode conductive film from the peripheral region, the dielectric film suppression member has conductivity and is set to have the reference potential, and the first electrode dielectric film is suppressed by the dielectric film suppression member from an upper side in the dielectric contact region.

Effects of the Invention

In the active gas generation apparatus according to the present disclosure, the first electrode dielectric film is suppressed by the dielectric film suppression member from the upper side in the dielectric contact region. Thus, a region where load is applied to the first electrode dielectric film by the dielectric film suppression member can be limited to a lower region of the dielectric contact region.

As a result, the active gas generation apparatus according to the present disclosure can fix the first electrode dielectric film between the dielectric contact region of the dielectric film suppression member and the support surface of the dielectric film support member without unnecessary bending stress applied to the first electrode dielectric film.

Furthermore, the dielectric non-contact region of the dielectric film suppression member set to have the reference potential and having conductivity is overlapped with the intermediate region of the first electrode dielectric film in a plan view.

As a result, electrical field strength of the first electrode conductive film can be reduced to reduce potential of the intermediate region of the first electrode dielectric film, thus an electrode unit in the active gas generation apparatus according to the present disclosure can prevent insulation breakdown in a gap between the first electrode dielectric film and the dielectric film support member.

These and other objects, features, aspects and advantages of the present disclosure will become more apparent from the following detailed description of the present disclosure when taken in conjunction with the accompanying drawings.

DESCRIPTION OF EMBODIMENT(S)

Embodiment 1

Figure 1:
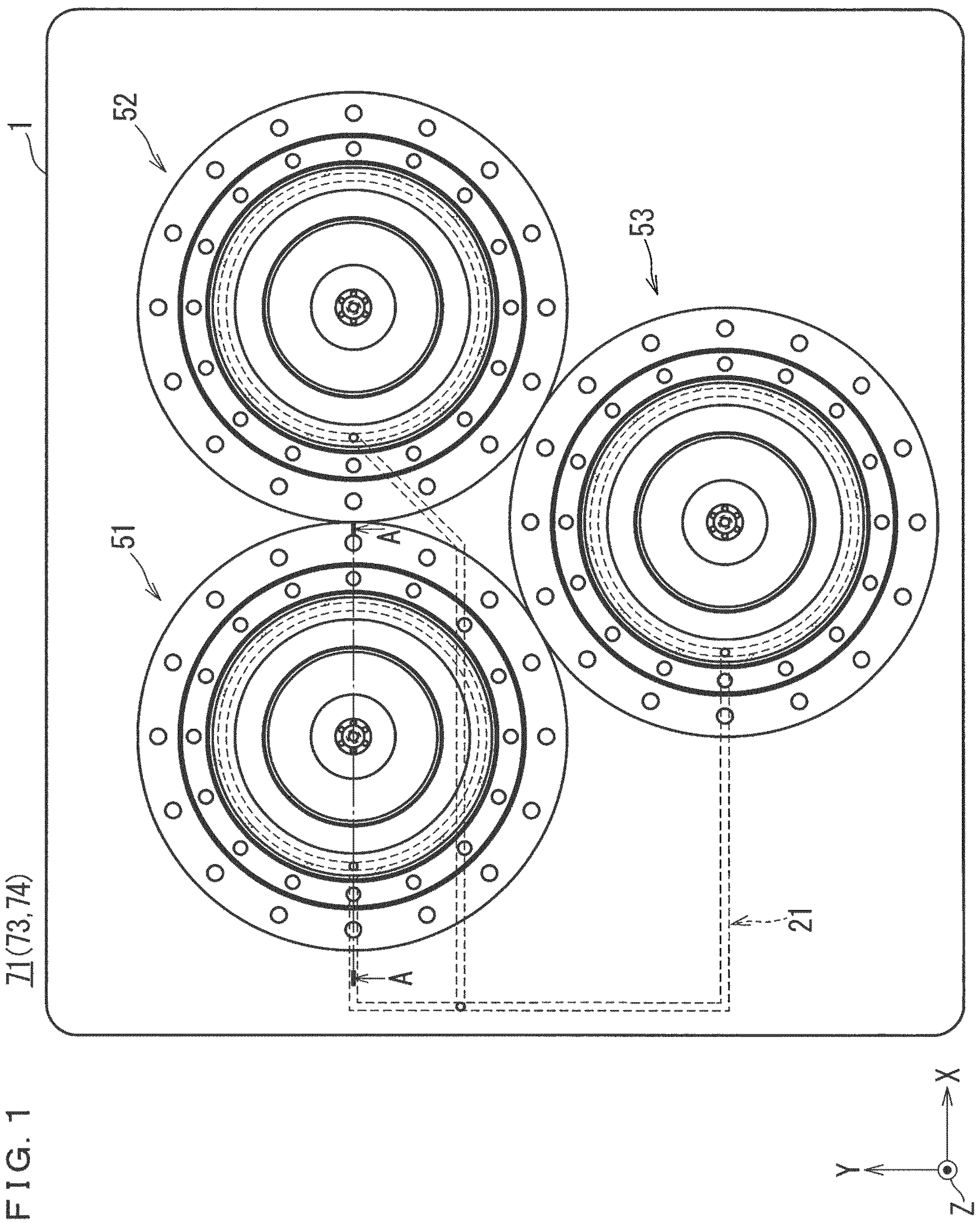
FIG. 1 A plan view schematically illustrating a planar structure of an active gas generation apparatus as an embodiment 1 according to the present disclosure.

FIG. 1 is a plan view schematically illustrating a planar structure of an active gas generation apparatus 71 as an embodiment 1 according to the present disclosure.

As illustrated in FIG. 1, three electrode units 51 to 53 are housed in a chassis 1 in the active gas generation apparatus 71. Material gas G1 is supplied to each of the electrode units 51 to 53 through a gas flow path 21. Each of the electrode units 51 to 53 activates the material gas G1 supplied to a discharge space 4 to generate active gas G2.

Figure 2:
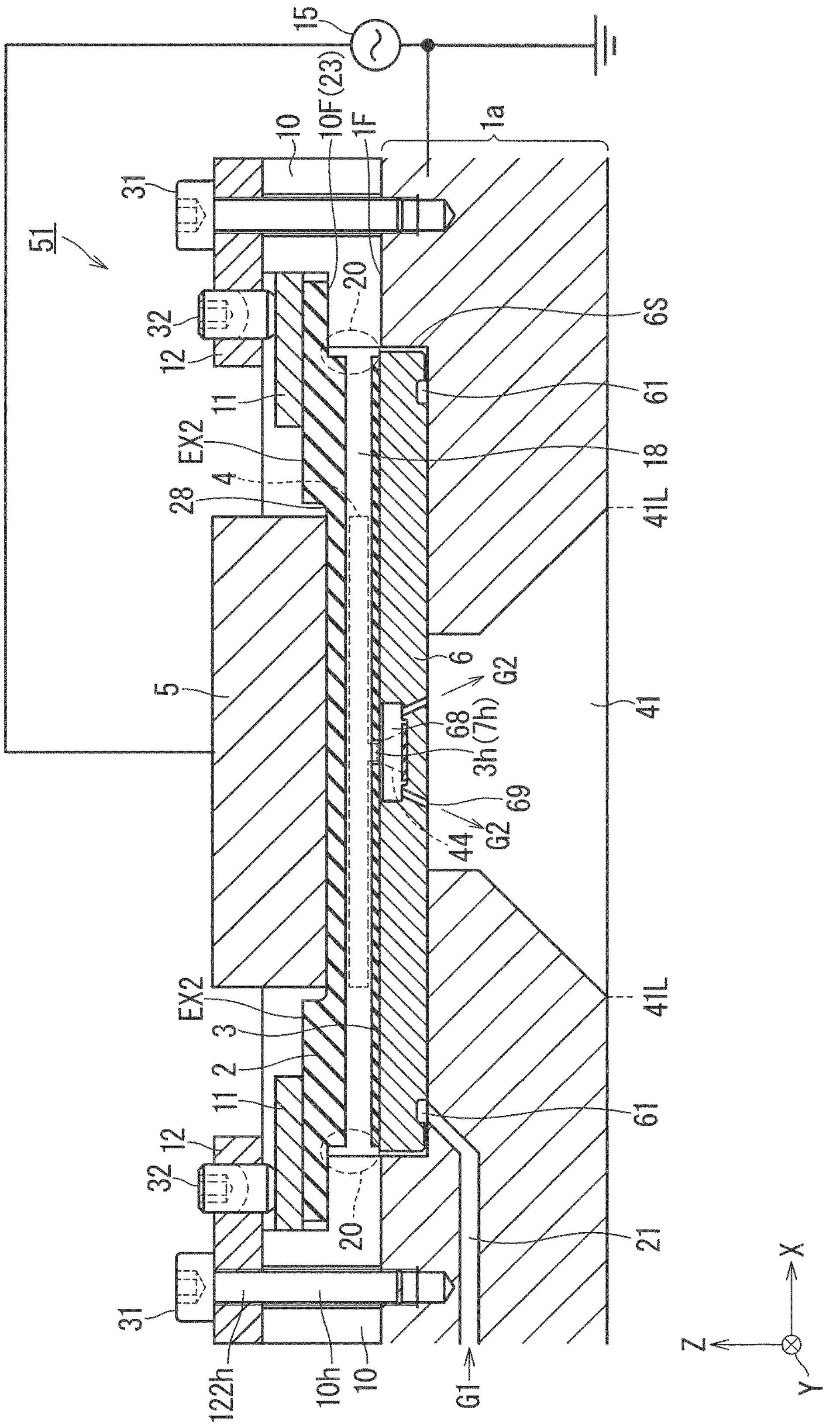
FIG. 2 A cross-sectional view illustrating a cross-section structure of an A-A cross section in FIG. 1.

FIG. 2 is a cross-sectional view illustrating a cross-section structure of an A-A cross section in FIG. 1. FIG. 3 to FIG. 6 are explanation diagrams each partially illustrating a structure of an electrode unit 50. The electrode unit 50 corresponds to any of the electrode units 51 to 53. The electrode units 51 to 53 have the same structure as each other.

Figure 3:
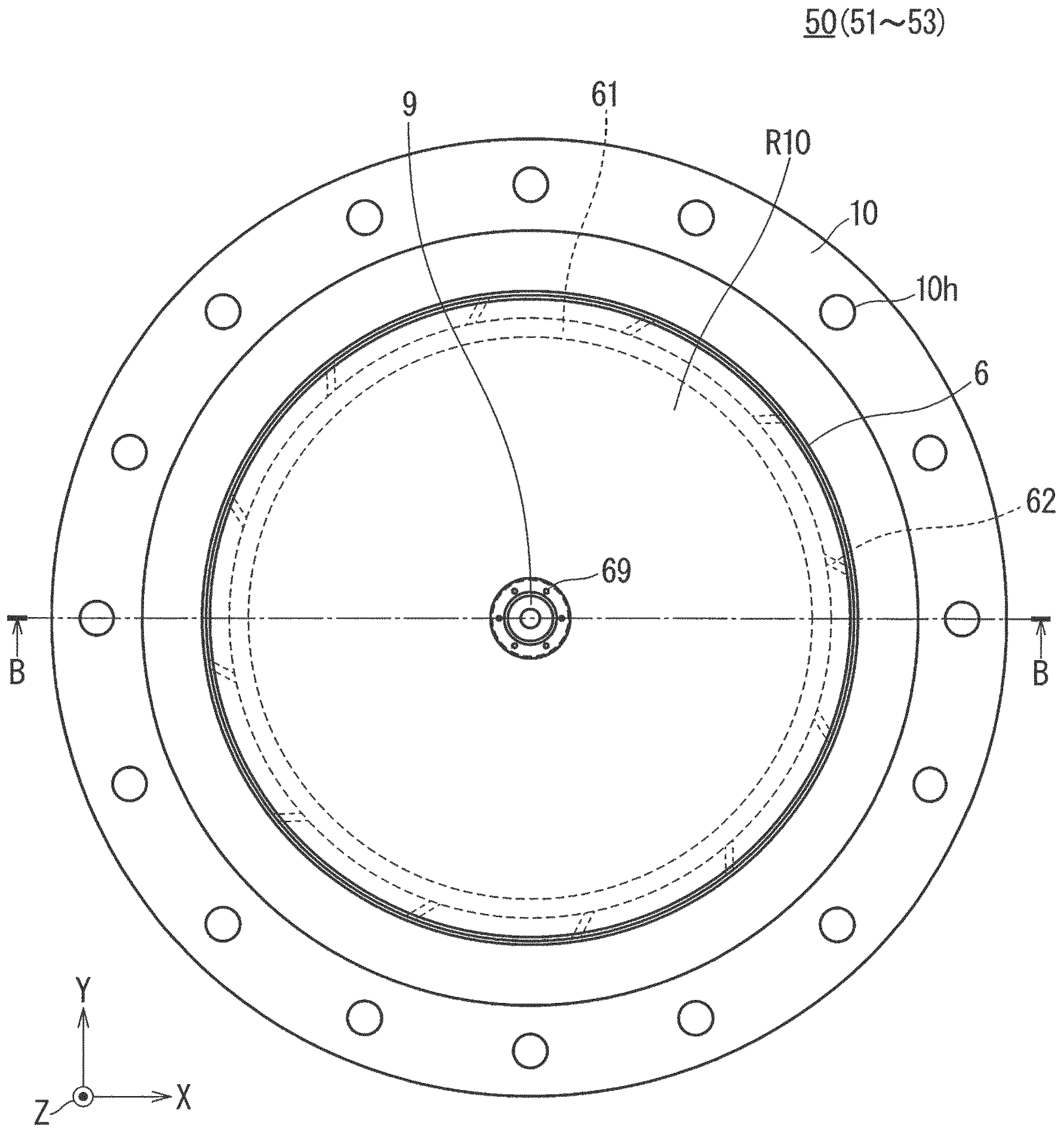
FIG. 3 An explanation diagram (No. 1) schematically illustrating a planar structure of an electrode unit.
Figure 4:
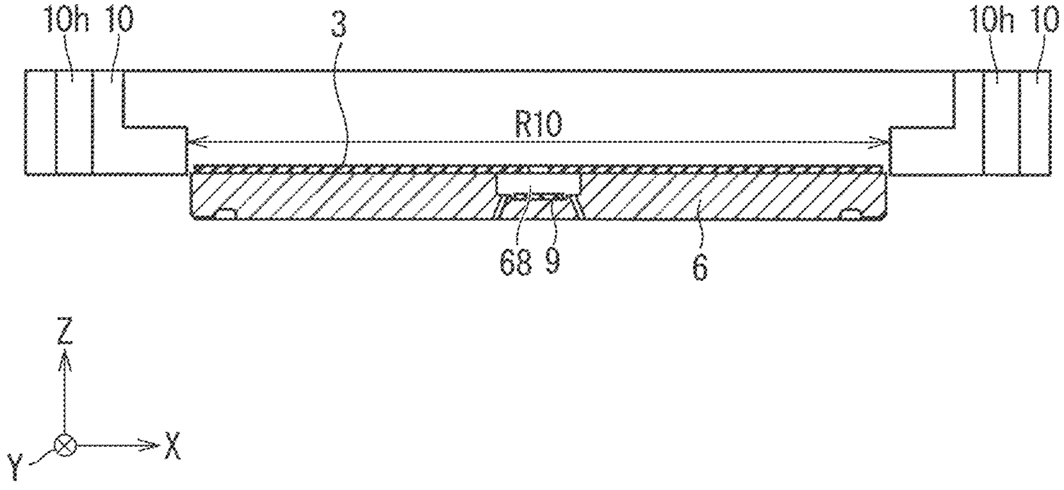
FIG. 4 An explanation diagram illustrating a cross-section structure of a B-B cross section in FIG. 3.

FIG. 3 is an explanation diagram schematically illustrating a planar structure of the electrode unit 50. FIG. 4 is an explanation diagram illustrating a cross-section structure of a B-B cross section in FIG. 3. Each of FIG. 3 and FIG. 4 is a first explanation diagram illustrating a structure of a ground conductor 6 and an area around the ground conductor 6.

Figure 5:
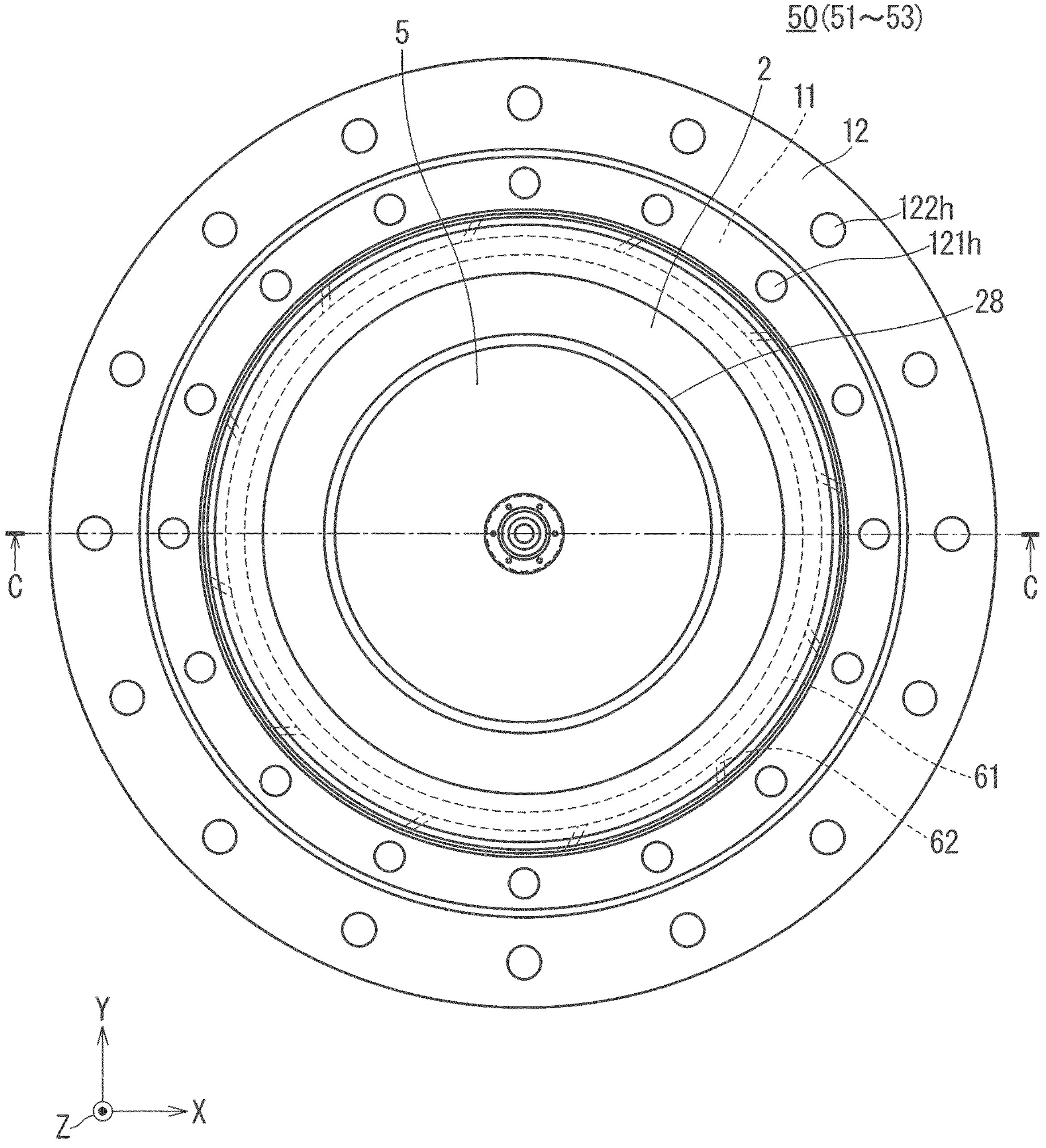
FIG. 5 An explanation diagram (No. 2) schematically illustrating a planar structure of the electrode unit.
Figure 6:
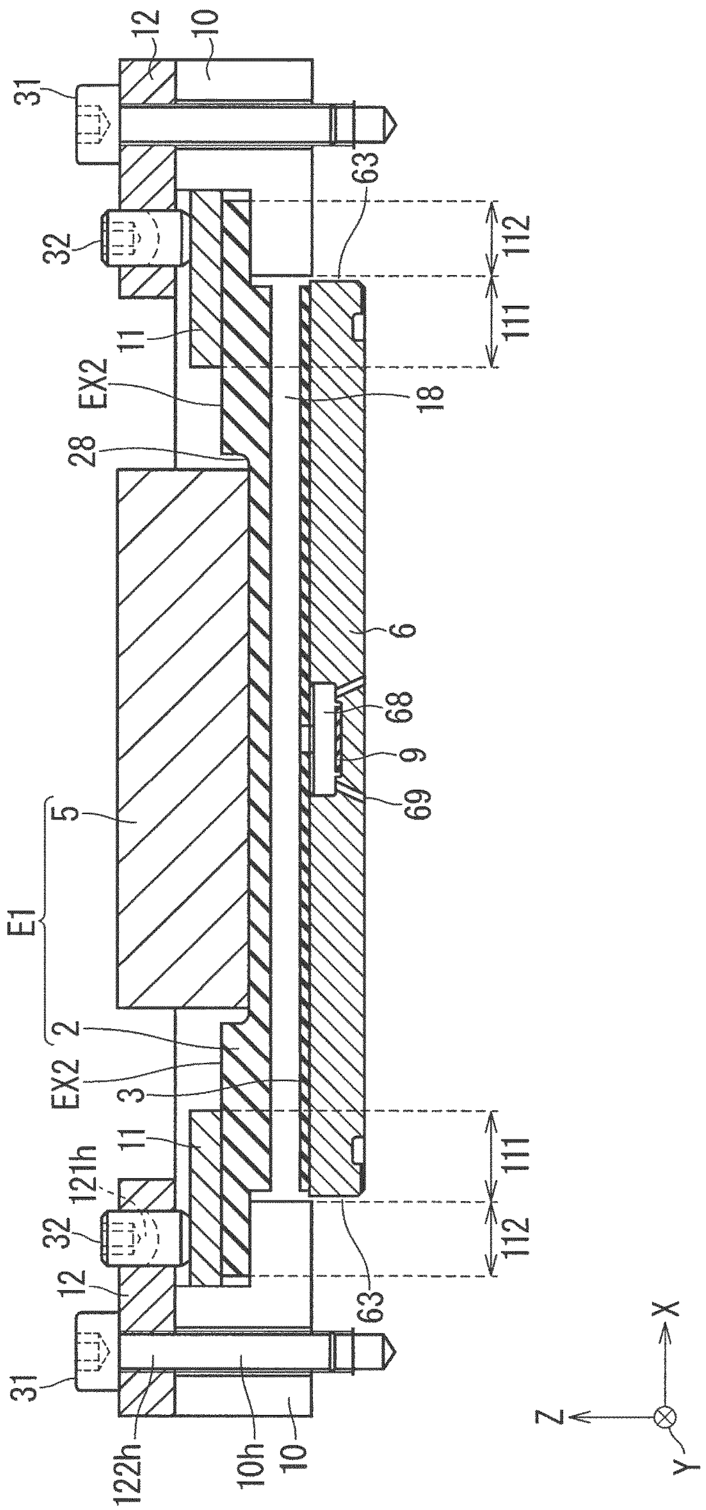
FIG. 6 An explanation diagram illustrating a cross-section structure of a C-C cross section in FIG. 5.

FIG. 5 is an explanation diagram schematically illustrating a planar structure of the electrode unit 50. FIG. 6 is an explanation diagram illustrating a cross-section structure of a C-C cross section in FIG. 5. Each of FIG. 5 and FIG. 6 is a second explanation diagram illustrating a detailed structure of the ground conductor 6 and the area around the ground conductor 6.

Figure 7:
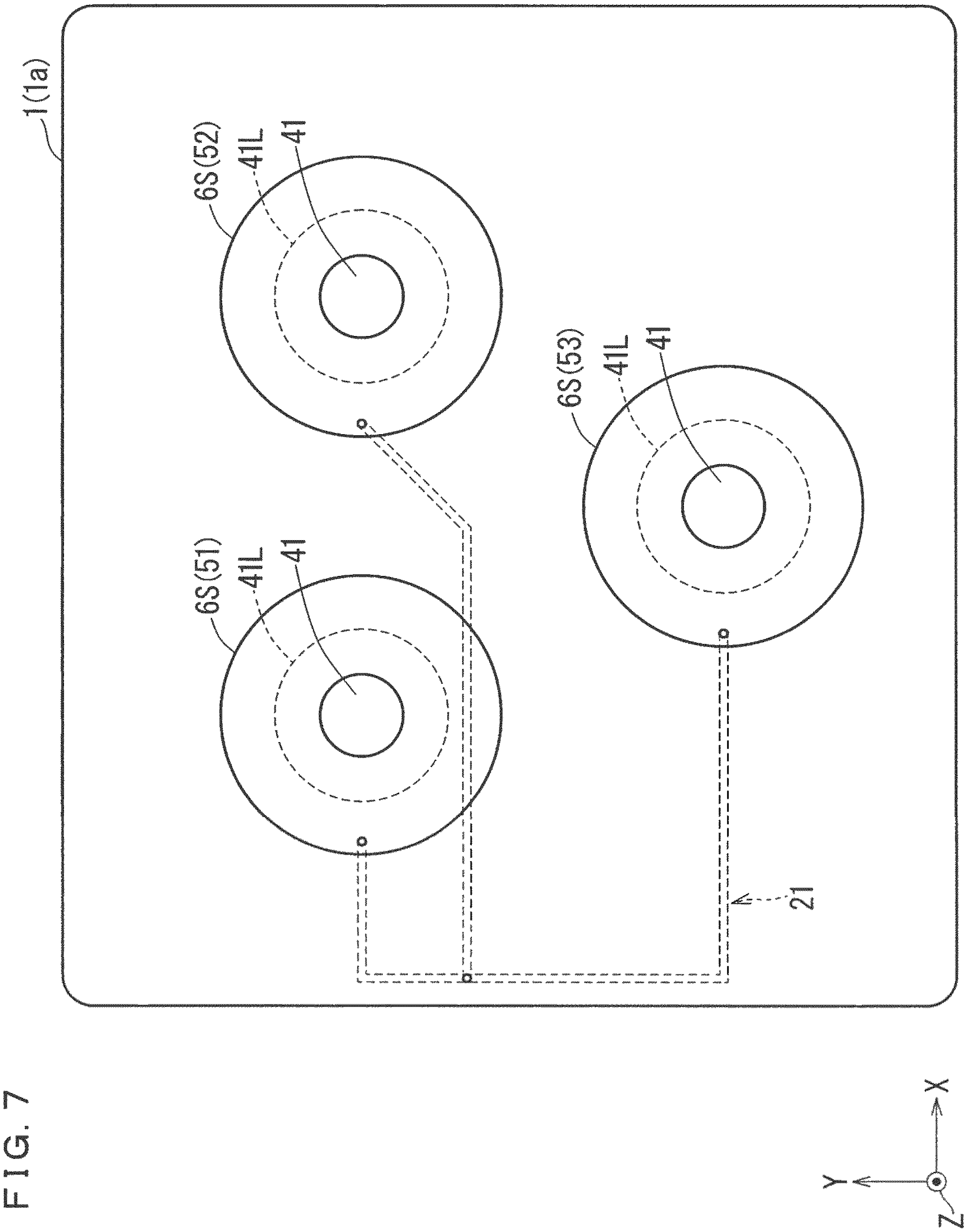
FIG. 7 An explanation diagram schematically illustrating a planar structure of a chassis.
Figure 8:
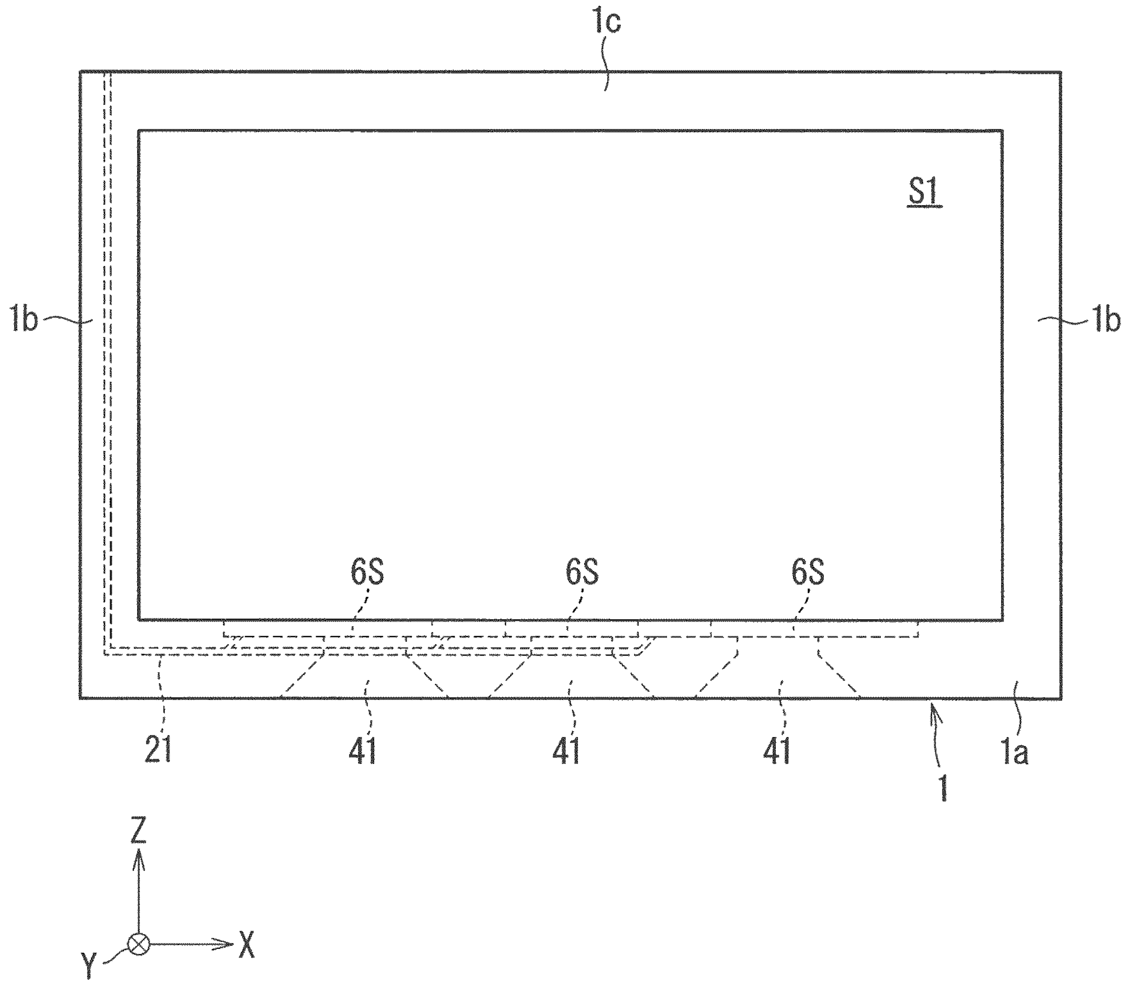
FIG. 8 An explanation diagram schematically illustrating a planar structure of the chassis.

FIG. 7 to FIG. 30 are explanation diagrams each illustrating details of constituent components of the electrode unit 50. FIG. 7 and FIG. 8 are explanation diagrams each schematically illustrating a structure of the chassis 1. FIG. 7 illustrates a planar structure of the chassis 1, and FIG. 8 illustrates a cross-section structure of the chassis 1.

Figure 9:
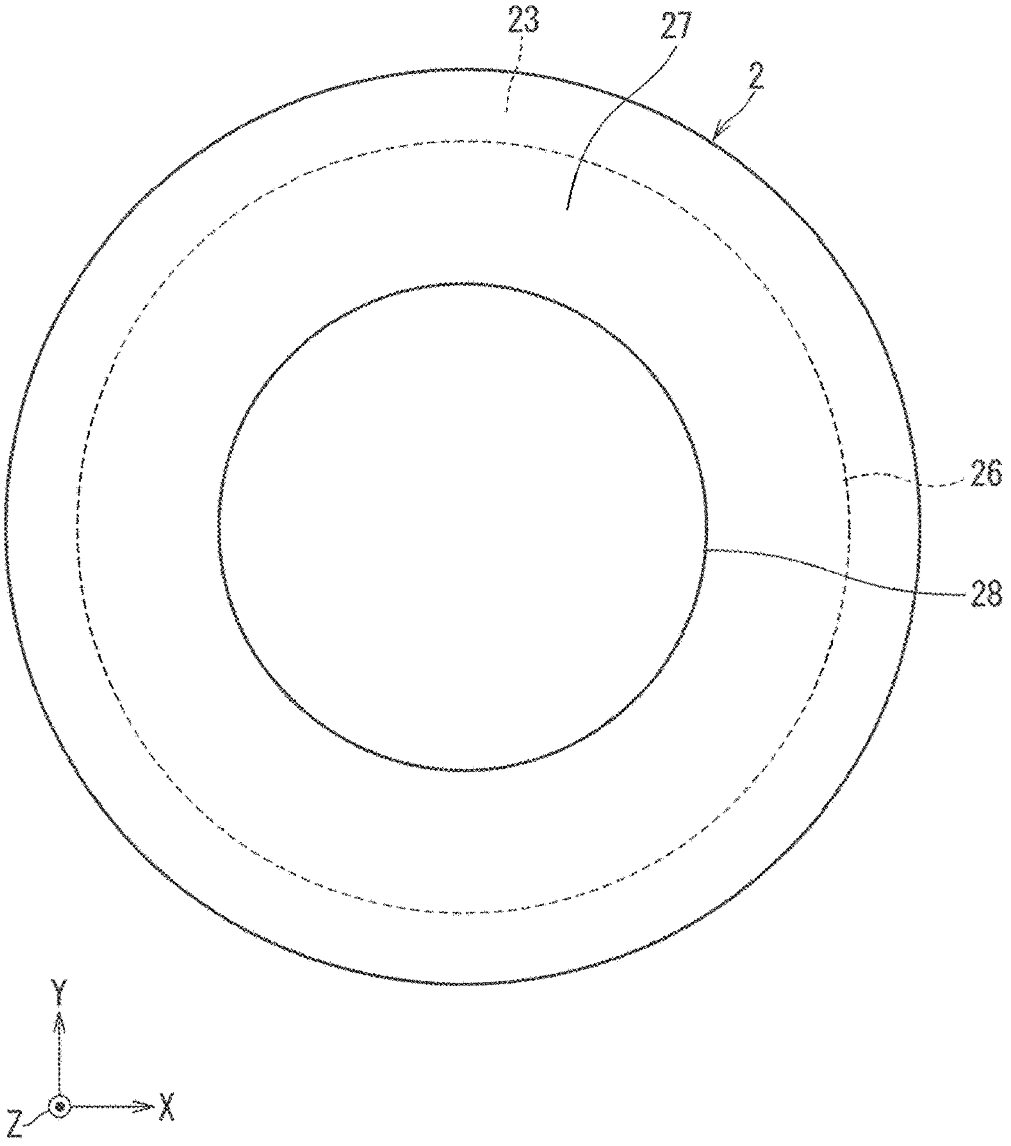
FIG. 9 An explanation diagram schematically illustrating a planar structure of a high voltage side dielectric film.
Figure 10:
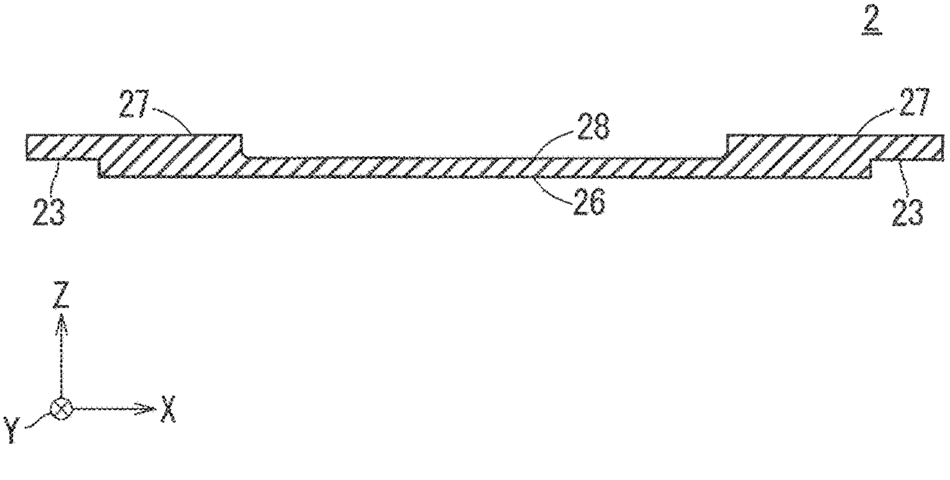
FIG. 10 An explanation diagram schematically illustrating a cross-section structure of the high voltage side dielectric film.

FIG. 9 and FIG. 10 are explanation diagrams each schematically illustrating a structure of a high voltage side dielectric film 2. FIG. 9 illustrates a planar structure of the high voltage side dielectric film 2, and FIG. 10 illustrates a cross-section structure of the high voltage side dielectric film 2.

Figure 11:
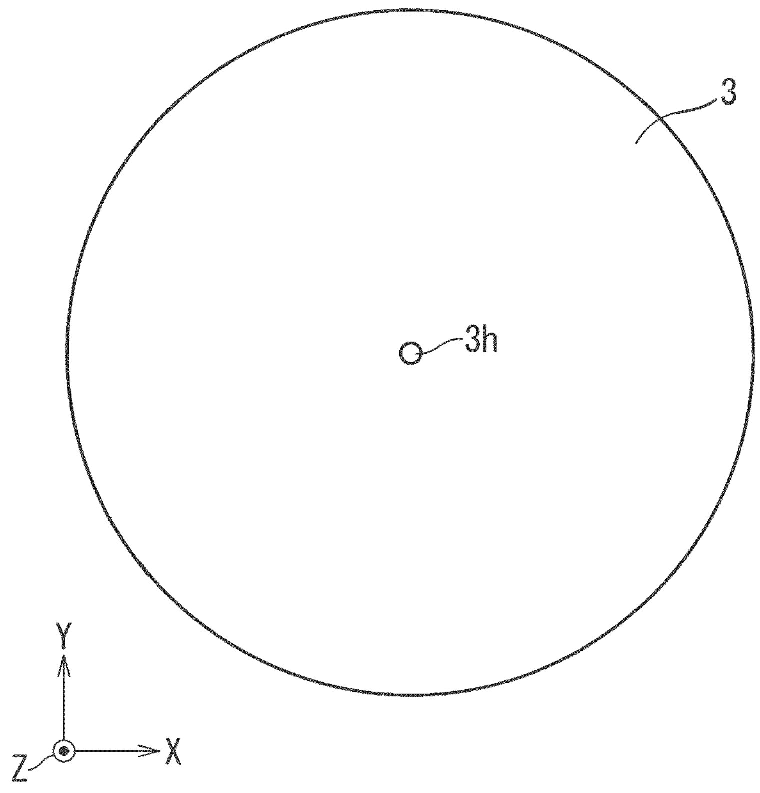
FIG. 11 An explanation diagram schematically illustrating a planar structure of a ground side dielectric film.
Figure 12:
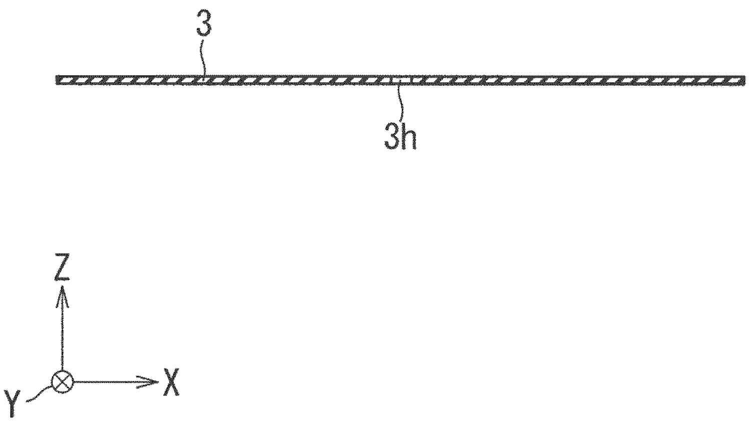
FIG. 12 An explanation diagram schematically illustrating a cross-section structure of a ground side dielectric film.

FIG. 11 and FIG. 12 are explanation diagrams each schematically illustrating a structure of a ground side dielectric film 3. FIG. 11 illustrates a planar structure of the ground side dielectric film 3, and FIG. 12 illustrates a cross-section structure of the ground side dielectric film 3.

Figure 13:
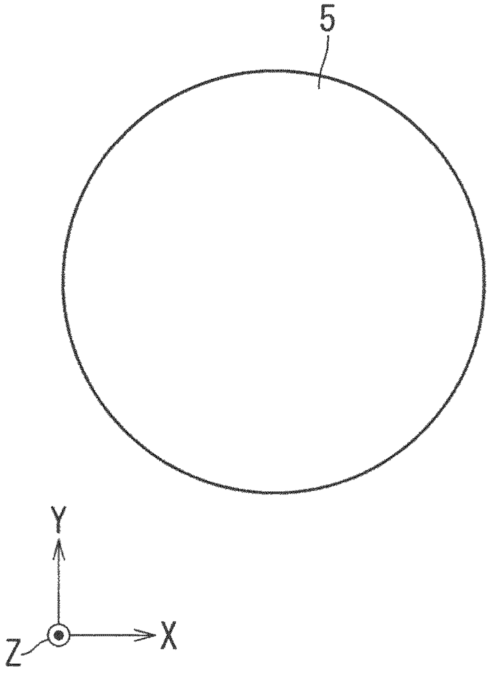
FIG. 13 An explanation diagram schematically illustrating a planar structure of a power supply body.
Figure 14:
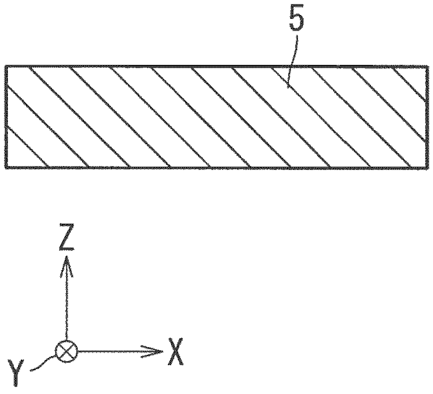
FIG. 14 An explanation diagram schematically illustrating a cross-section structure of the power supply body.

FIG. 13 and FIG. 14 are explanation diagrams each schematically illustrating a structure of a power supply body 5. FIG. 13 illustrates a planar structure of the power supply body 5, and FIG. 14 illustrates a cross-section structure of the power supply body 5.

Figure 15:
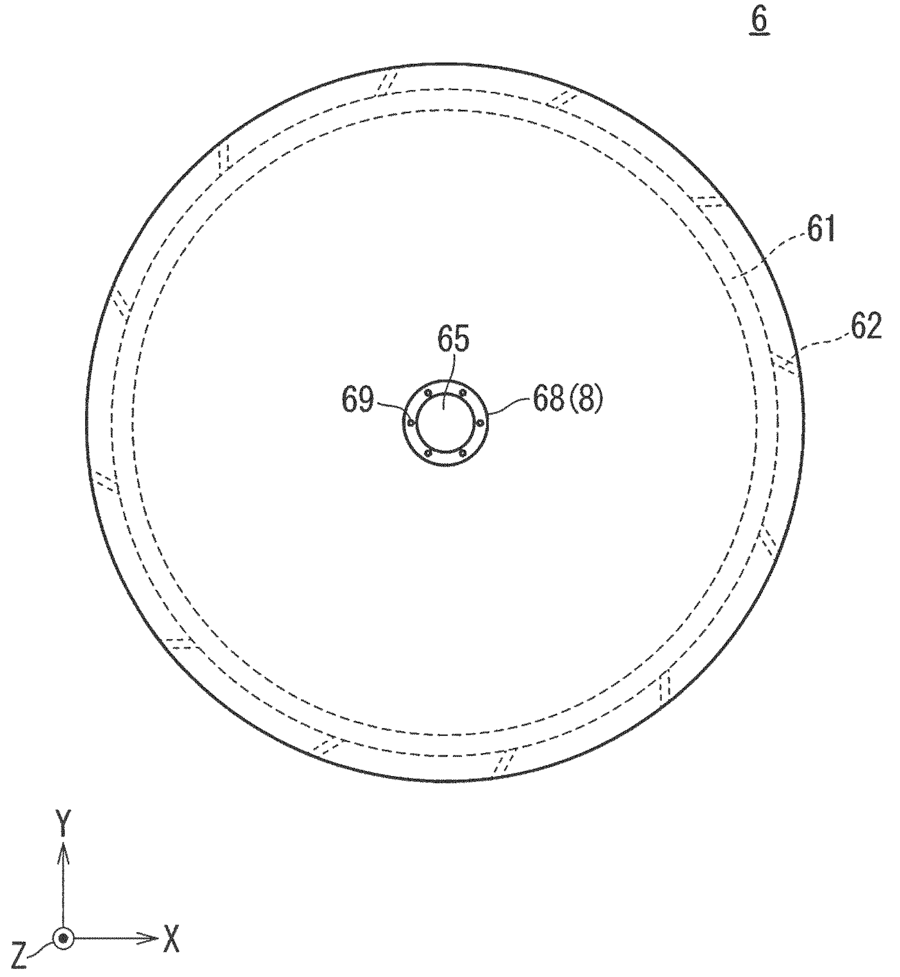
FIG. 15 An explanation diagram schematically illustrating a planar structure of a ground conductor.
Figure 16:
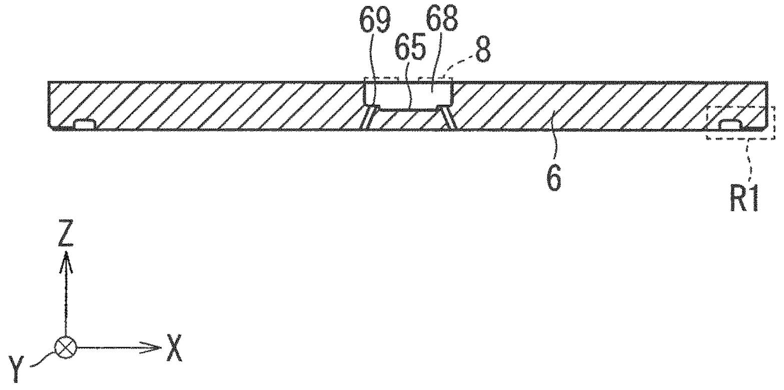
FIG. 16 An explanation diagram schematically illustrating a cross-section structure of the ground conductor.
Figure 17:
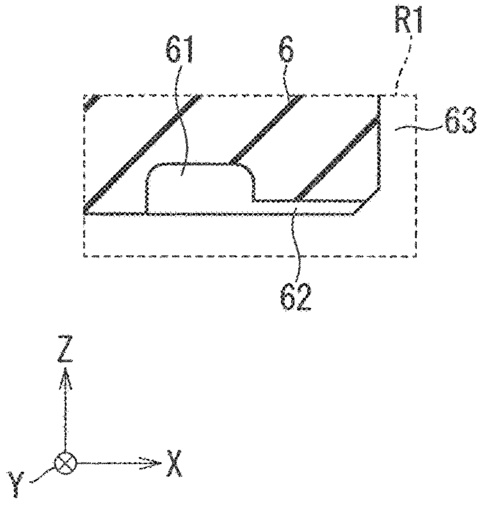
FIG. 17 An explanation diagram illustrating details of a focus region in FIG. 16.

FIG. 15 and FIG. 17 are explanation diagrams each schematically illustrating a structure of a ground conductor 6. FIG. 15 illustrates a planar structure of the ground conductor 6, FIG. 16 illustrates a cross-section structure of the ground conductor 6, and FIG. 17 illustrates details of a focus region R1 in FIG. 16.

Figure 18:
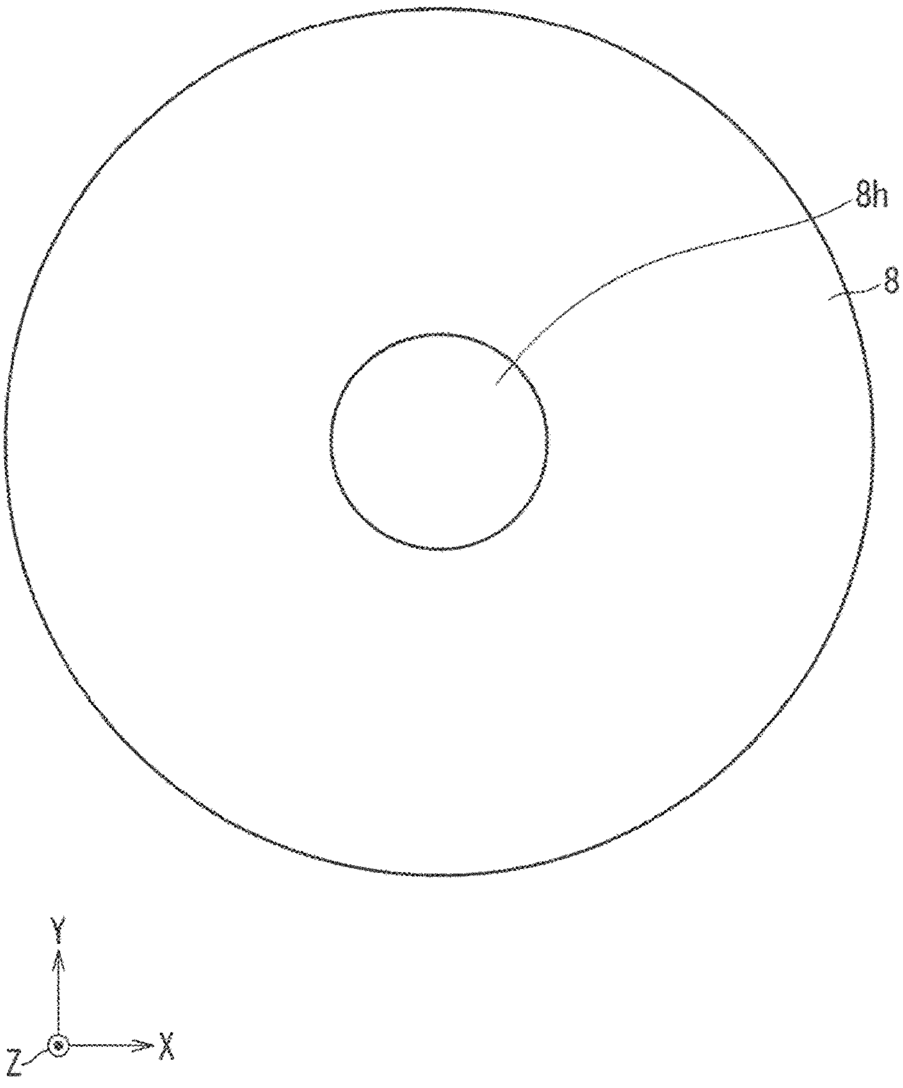
FIG. 18 An explanation diagram schematically illustrating a planar structure of a cover dielectric film.
Figure 19:
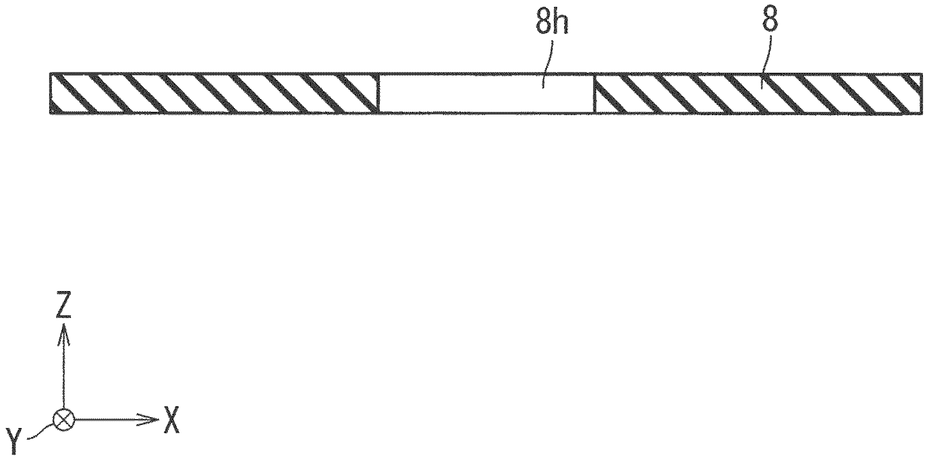
FIG. 19 An explanation diagram schematically illustrating a cross-section structure of the cover dielectric film.
Figure 20:
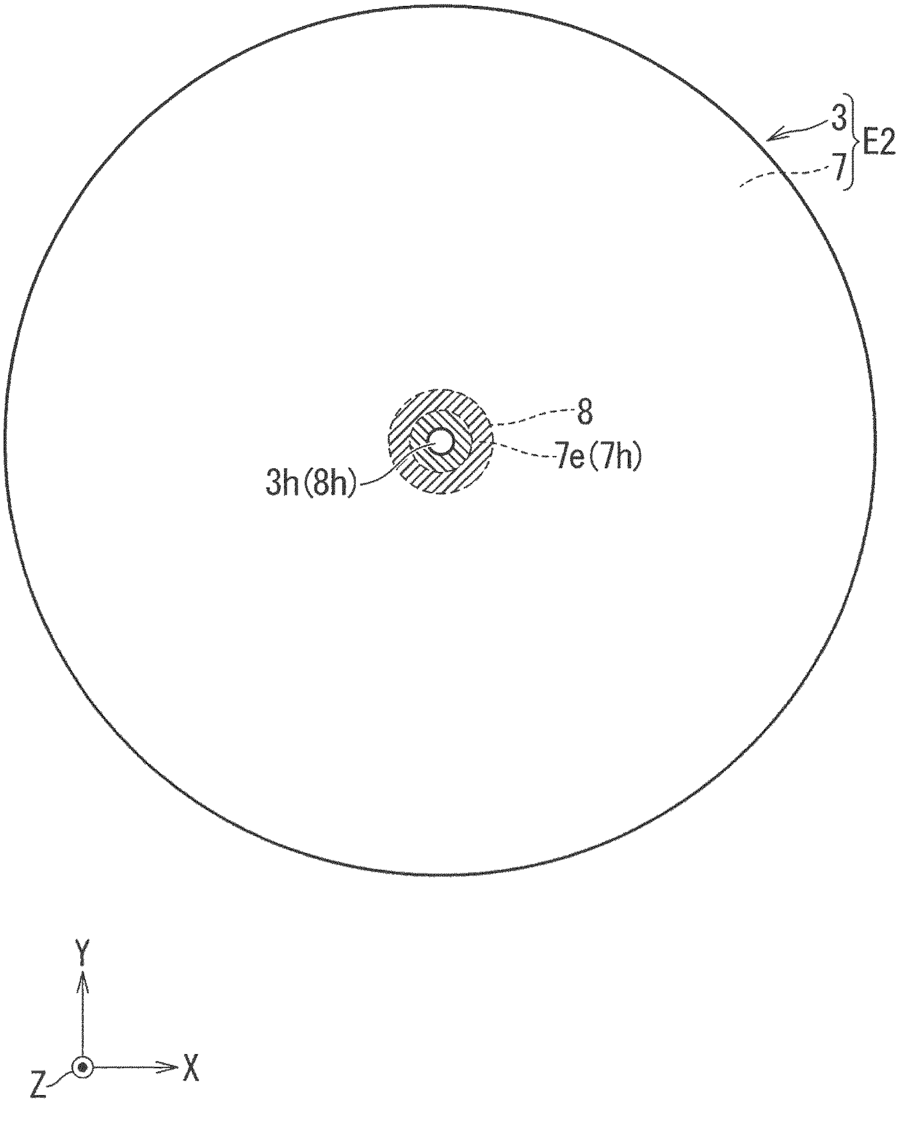
FIG. 20 An explanation diagram schematically illustrating a planar structure of a ground side electrode constituting part.
Figure 21:
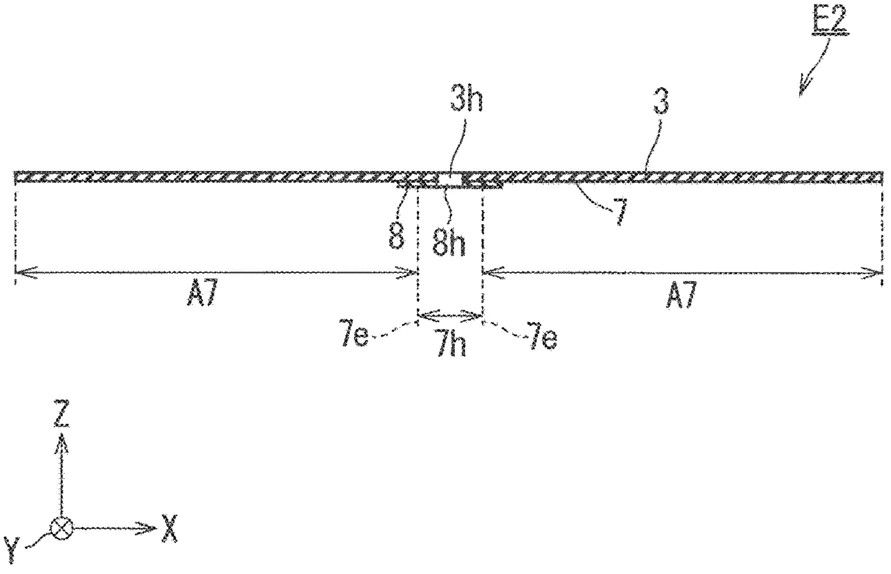
FIG. 21 An explanation diagram schematically illustrating a cross-section structure of the ground side electrode constituting part.

FIG. 18 and FIG. 19 are explanation diagrams each schematically illustrating a structure of a cover dielectric film 8. FIG. 18 illustrates a planar structure of the cover dielectric film 8, and FIG. 19 illustrates a cross-section structure of the cover dielectric film FIG. 20 and FIG. 21 are explanation diagrams each schematically illustrating a structure of a ground side electrode constituting part E2. FIG. 20 illustrates a planar structure of the ground side electrode constituting part E2, and FIG. 21 illustrates a cross-section structure of the ground side electrode constituting part E2. The ground side electrode constituting part E2 includes a combination structure of the ground side dielectric film 3, a conductive film 7, and the cover dielectric film 8.

Figure 22:
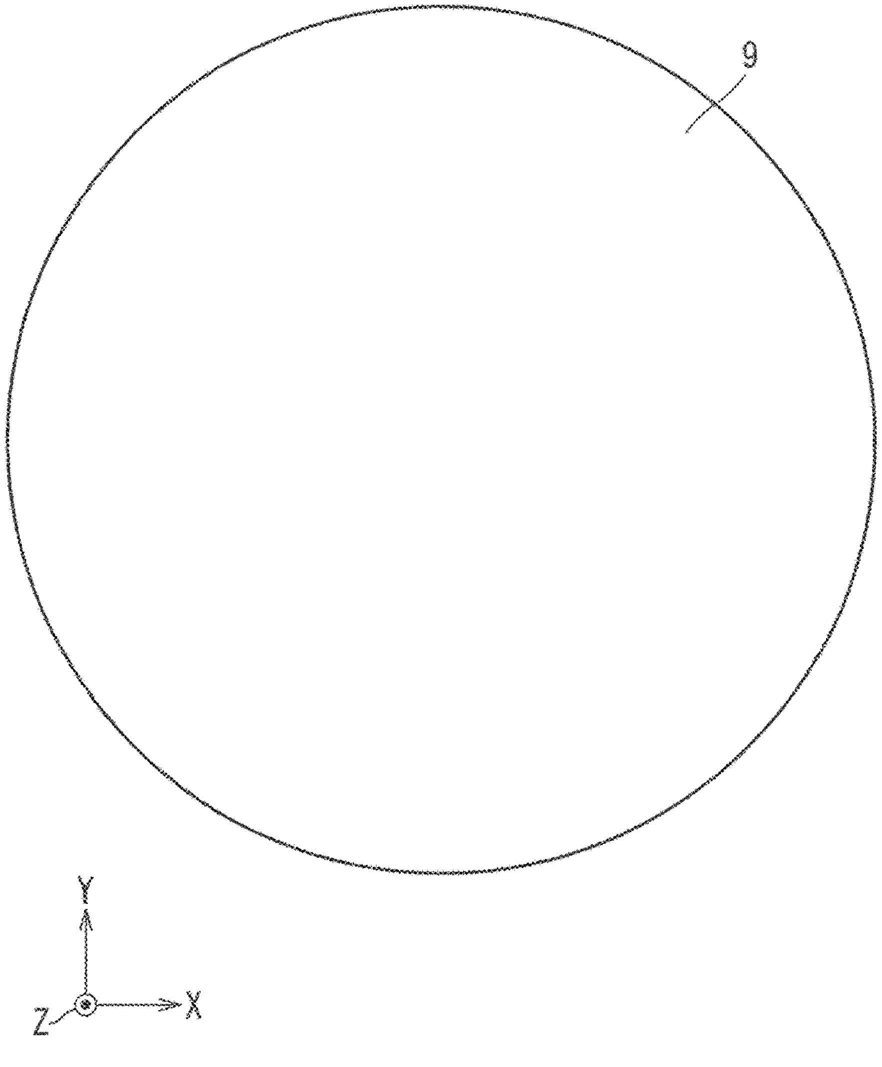
FIG. 22 An explanation diagram schematically illustrating a planar structure of a shield dielectric film.
Figure 23:
FIG. 23 An explanation diagram schematically illustrating a cross-section structure of the shield dielectric film.

FIG. 22 and FIG. 23 are explanation diagrams each schematically illustrating a structure of a shield dielectric film 9. FIG. 22 illustrates a planar structure of the shield dielectric film 9, and FIG. 23 illustrates a cross-section structure of the shield dielectric film 9.

Figure 24:
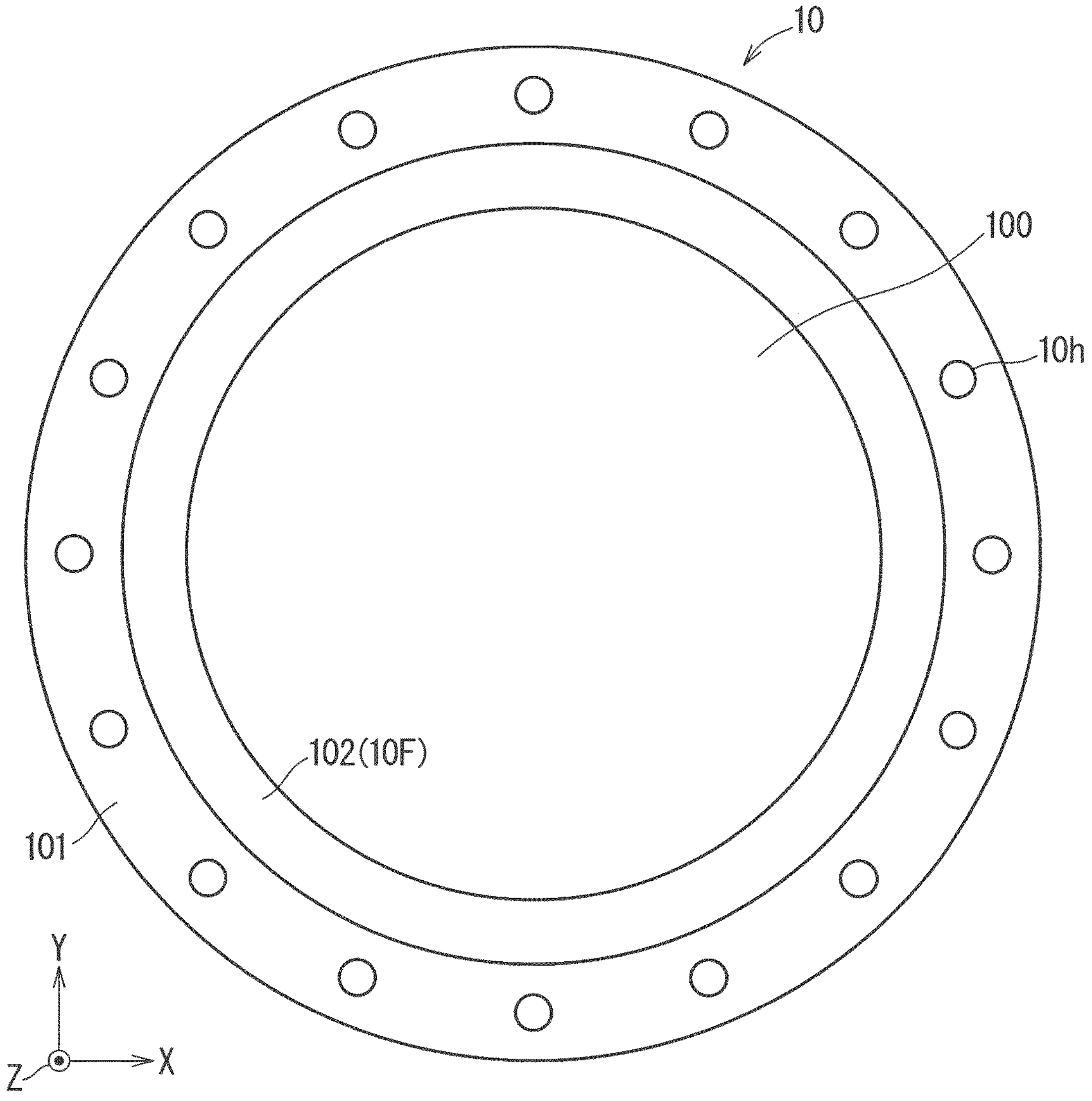
FIG. 24 An explanation diagram schematically illustrating a planar structure of a dielectric film support member.
Figure 25:
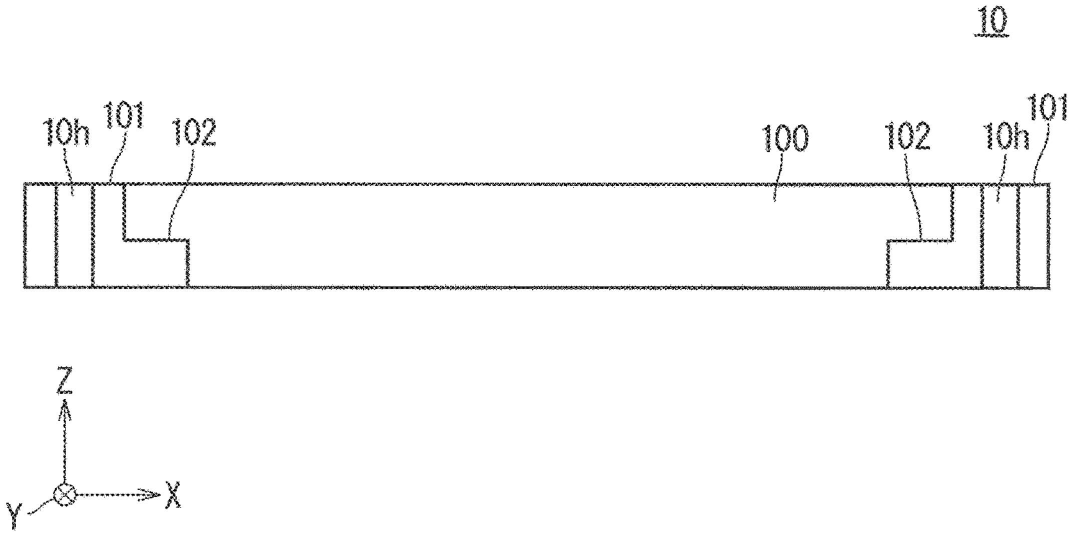
FIG. 25 An explanation diagram schematically illustrating a cross-section structure of a dielectric film support member.

FIG. 24 and FIG. 25 are explanation diagrams each schematically illustrating a structure of a dielectric film support member 10. FIG. 24 illustrates a planar structure of the dielectric film support member 10, and FIG. 25 illustrates a cross-section structure of the dielectric film support member 10.

Figure 26:
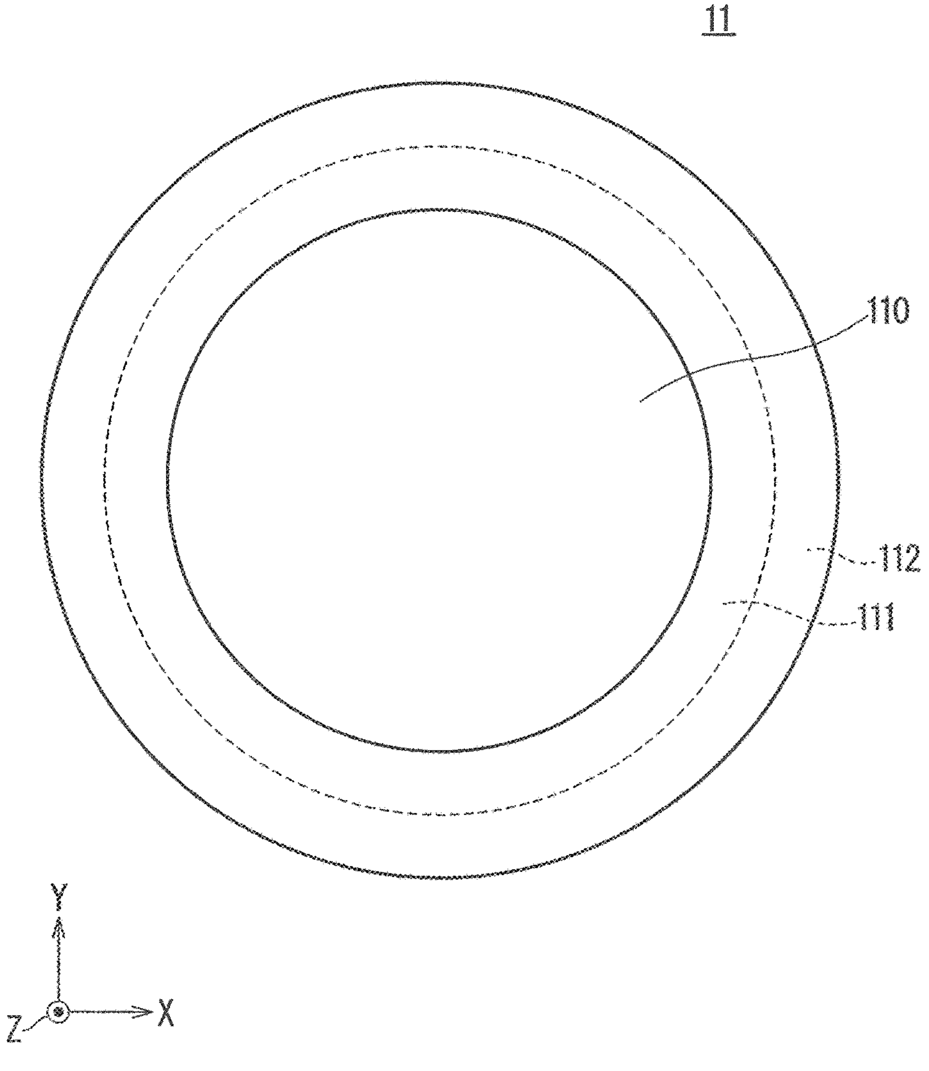
FIG. 26 An explanation diagram schematically illustrating a planar structure of a dielectric film suppression member.
Figure 27:
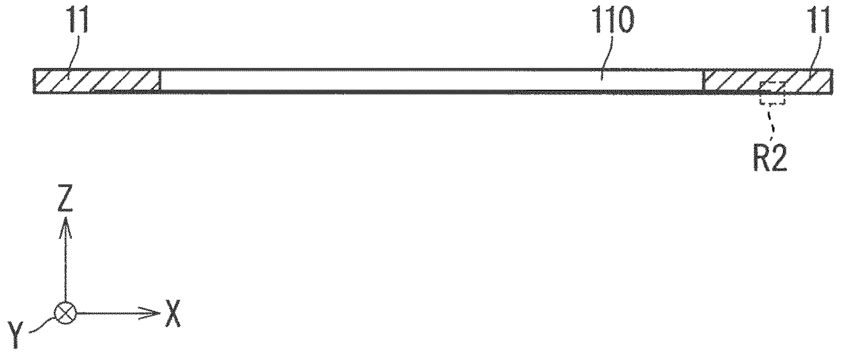
FIG. 27 An explanation diagram schematically illustrating a cross-section structure of the dielectric film suppression member.
Figure 28:
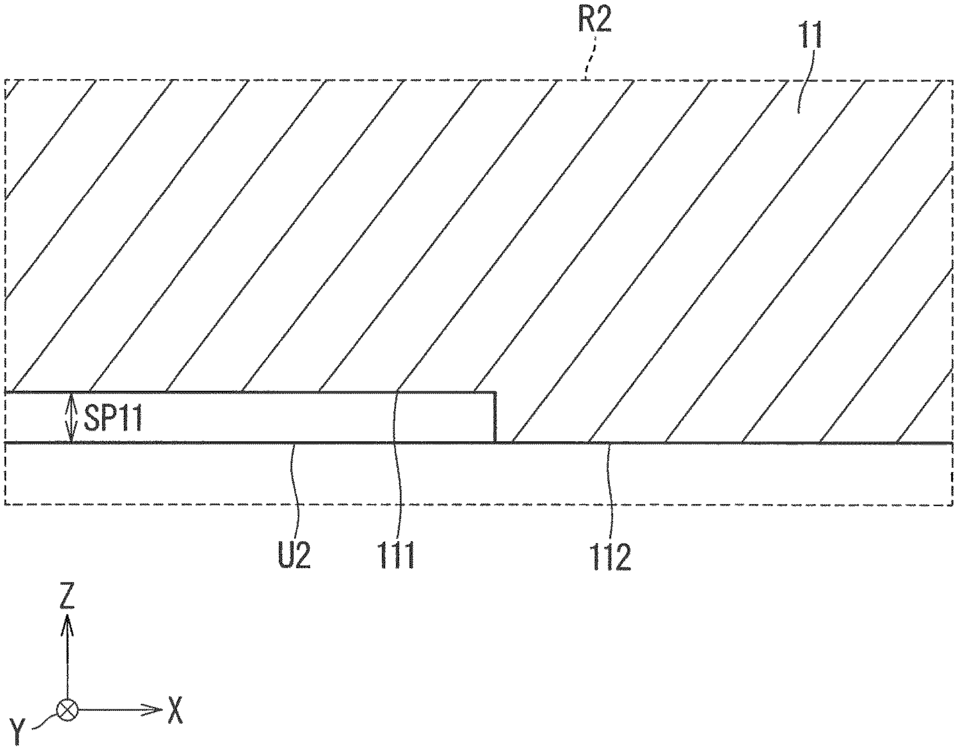
FIG. 28 An explanation diagram illustrating details of a focus region in FIG. 27.

FIG. 26 to FIG. 28 are explanation diagrams each schematically illustrating a structure of a dielectric film suppression member 11. FIG. 26 illustrates a planar structure of the dielectric film suppression member 11, FIG. 27 illustrates a cross-section structure of the dielectric film suppression member 11, and FIG. 28 illustrates details of a focus region R2 in FIG. 27.

Figure 29:
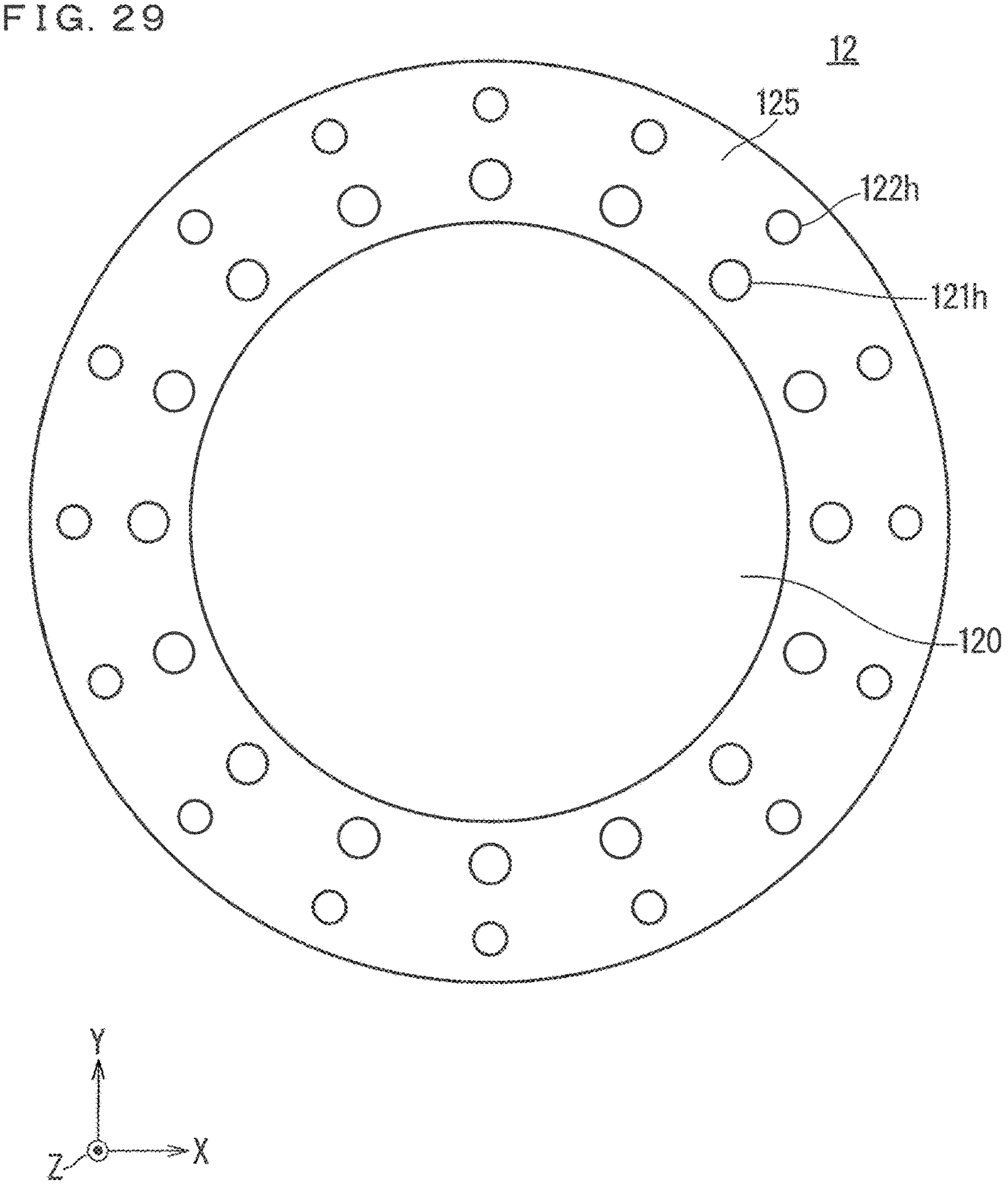
FIG. 29 An explanation diagram schematically illustrating a planar structure of a press member.
Figure 30:
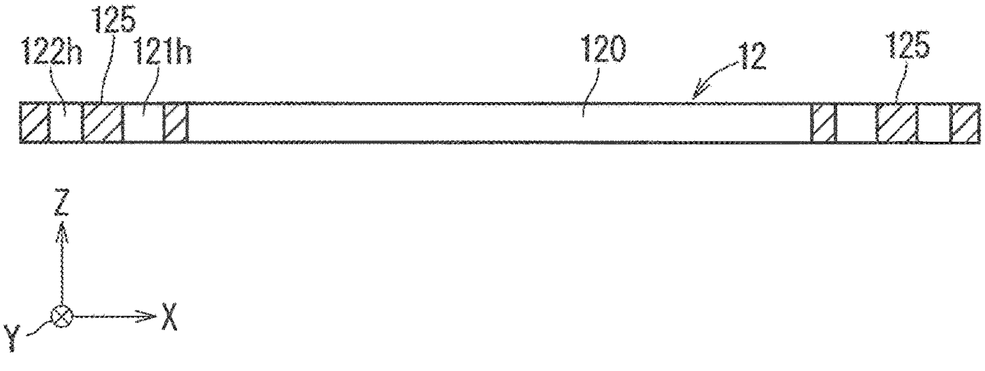
FIG. 30 An explanation diagram schematically illustrating a cross-section structure of the press member.

FIG. 29 and FIG. 30 are explanation diagrams each schematically illustrating a structure of a press member 12. FIG. 29 illustrates a planar structure of the press member 12, and FIG. 30 illustrates a cross-section structure of the press member 12.

Each of FIG. 1 to FIG. 30 schematically illustrates constituent components of the active gas generation apparatus 71, the electrode unit 50, or the electrode unit 50, and a shape including scale reduction does not necessarily coincide with each other in FIG. 1 to FIG. 30. An XYZ rectangular coordinate system is illustrated in each of FIG. 1 to FIG. 30.

The active gas generation apparatus 71 according to the embodiment 1 is described hereinafter appropriately with reference to FIG. 1 to FIG. 30 described above.

(Whole Structure)

As illustrated in FIG. 1, the active gas generation apparatus 71 includes the electrode units 51 to 53 as the plurality of electrode units and the chassis 1 housing the electrode units 51 to 53 in a chassis space S1 (refer to FIG. 8) and having conductivity.

As illustrated in FIG. 2 and FIG. 7, the chassis 1 includes a chassis bottom part 1*a* including a flat surface 1F and a conductor housing space 6S concaved from the flat surface 1F in a depth direction.

As illustrated in FIG. 8, the chassis 1 includes the chassis bottom part 1*a*, a chassis side part 1*b*, and a chassis upper part 1*c*, and the chassis space S1 housing the electrode units 51 to 53 therein is formed by the chassis bottom part 1*a*, the chassis side part 1*b*, and the chassis upper part 1*c*.

Each of the electrode units 51 to 53 is housed in the chassis space S1 in the chassis 1 in a state where the ground conductor 6 is disposed in the conductor housing space 6S. As illustrated in FIG. 7, the material gas G1 supplied from an outer portion is supplied to a material gas flow space provided in a lower surface and a side surface of the ground conductor 6 disposed in the conductor housing space 6S through the gas flow path 21 provided in the chassis bottom part 1*a*.

The electrode unit 51 (50) includes a high voltage side electrode constituting part E1 as a first electrode constituting part and the ground side electrode constituting part E2 as a second electrode constituting part provided on a lower side of the high voltage side electrode constituting part E1 as the first electrode constituting part.

The electrode unit 51 further includes the ground conductor 6 as a reference potential conductor provided on a lower side of the ground side electrode constituting part E2 as the second electrode constituting part and housed in the conductor housing space 6S. The ground conductor 6 includes a conductor such as metal as a constituent material.

The high voltage side electrode constituting part E1 includes the high voltage side dielectric film 2 as the first electrode dielectric film and the power supply body 5 as the first electrode conductive film formed on the upper surface of the high voltage side dielectric film 2. The power supply body 5 as the first electrode conductive film is provided on a power supply body arrangement concave part 28 provided in a center of the high voltage side dielectric film 2 as the first electrode dielectric film.

The high voltage side dielectric film 2 includes a dielectric as a constituent material, and the power supply body 5 includes a conductor such as metal as a constituent material. For example, the power supply body 5 is made of metal.

The ground side electrode constituting part E2 includes the ground side dielectric film 3 as the second electrode dielectric film and the conductive film 7 as the second electrode conductive film formed on the lower surface of the ground side dielectric film 3. The conductive film 7 has a small film thickness, thus illustration thereof is omitted in FIG. 2 etc., and a formation region of the conductive film 7 is illustrated in FIG. 20 and FIG. 21.

The ground side dielectric film 3 includes a dielectric as a constituent material, and the conductive film 7 includes a conductor such as metal as a constituent material.

The ground conductor 6 as the reference potential conductor includes an active gas buffer space 68 which does not pass through an upper portion, and the ground side electrode constituting part E2 is disposed to cover the active gas buffer space 68. Accordingly, a lower surface of the conductive film 7 and an upper surface of the ground conductor 6 have a contact relationship on an outer side of the active gas buffer space 68.

The ground side dielectric film 3 as the second electrode dielectric film includes a dielectric through port 3*h* passing through the ground side dielectric film 3 in a region overlapped with the active gas buffer space 68 in a plan view, the conductive film 7 as the second electrode conductive film includes a conductive film opening part 7*h* in a region overlapped with the active gas buffer space 68 in a plan view, and the conductive film opening part 7*h* is overlapped with the dielectric through port 3*h* in a plan view.

The chassis bottom part 1*a* of the chassis 1 includes the gas flow path 21 receiving the material gas G1 from an outer portion, and a material gas flow space is provided between the ground conductor 6 and the conductor housing space 6S in the chassis 1. As described hereinafter, the material gas flow space includes a material gas buffer space 61, a slit space 62, and a side surface space 63.

The material gas G1 is introduced into a main discharge space of the discharge space 4 through the gas flow path 21 and the material gas flow space described above. As described hereinafter, the main discharge space indicates the discharge space 4 in a dielectric space 18 between the high voltage side dielectric film 2 and the ground side dielectric film 3.

Alternating-current voltage applied from an alternating-current power source 15 is applied to the power supply body 5 as the first electrode conductive film via an electrical connection means such as an electrical wiring or an introduction terminal. Illustration of the electrical connection means is omitted in FIG. 2 etc.

In the meanwhile, the chassis 1 is set to have ground potential as reference potential. Accordingly, the conductive film 7 as the second electrode conductive film is set to have ground potential via the chassis 1 and the ground conductor 6.

The electrode unit 51 (50) further includes an auxiliary member such as the dielectric film support member 10, the dielectric film suppression member 11, and the press member 12.

(Fixation of High Voltage Side Dielectric Film 2)

A level difference part 102 of the dielectric film support member 10 includes an upper surface serving as a support surface 10F provided on the flat surface 1F of the chassis 1 to support the high voltage side dielectric film 2 from a lower side. At this time, the dielectric film support member 10 is disposed on the flat surface 1F so that a side surface of the dielectric film support member 10 and a side surface of the conductor housing space 6S on the chassis bottom part 1*a* of the chassis 1 coincide with each other.

The dielectric film suppression member 11 is a member for suppressing the high voltage side dielectric film 2 from an upper side, and is not overlapped with the power supply body 5 in a plan view. That is to say, an exposed region EX2 where the dielectric film suppression member 11 and the power supply body 5 are not formed is located on the upper surface of the high voltage side dielectric film 2.

As illustrated in FIG. 6, FIG. 27, and FIG. 28, a lower surface of the dielectric film suppression member 11 includes a dielectric contact region 112 having contact with the upper surface of the high voltage side dielectric film 2 and a dielectric non-contact region 111 which does not have contact with the upper surface of the high voltage side dielectric film 2. The dielectric contact region 112 serves as a region having contact with the high voltage side dielectric film 2 to apply load, and the dielectric non-contact region

111 serves as a region protruding to a side of the power supply body 5 on the upper surface of the high voltage side dielectric film 2 without having a contact relationship with the high voltage side dielectric film 2.

The dielectric contact region 112 is overlapped with a peripheral region of the high voltage side dielectric film 2 and the support surface 10F of the dielectric film support member 10 in a plan view, and the dielectric non-contact region 111 is overlapped with an intermediate region on an inner side of the peripheral region of the high voltage side dielectric film 2. That is to say, the intermediate region is a region adjacent to a side of the power supply body 5 from the peripheral region of the high voltage side dielectric film 2.

The dielectric film suppression member 11 is made of metal etc., has conductivity, and is set to have ground potential as reference potential via the chassis 1, an attachment bolt 31, and the press member 12. The attachment bolt 31 and the press member 12 also have conductivity.

Accordingly, the high voltage side dielectric film 2 is suppressed by the dielectric film suppression member 11 from the upper side in the dielectric contact region 112. A combination structure of the dielectric film support member 10, the dielectric film suppression member 11, and the press member 12 is described in detail hereinafter.

As illustrated in FIG. 2, the press member 12 is disposed on the upper surface of the dielectric film support member 10, and the press member 12 and the dielectric film support member 10 are fixed on the chassis bottom part 1*a* of the chassis 1 by the attachment bolt 31.

As illustrated in FIG. 24 and FIG. 25, the dielectric film support member 10 has a circular shape having a center opening part 100 in a center thereof in a plan view. A level difference structure made up of a level difference part 102 and a peripheral part upper surface 101 is provided to have an annular shape around the center opening part 100. An upper surface of the level difference part 102 serves as the support surface 10F. A plurality of through ports 10*h* are dispersedly disposed to have a circular shape in the peripheral part upper surface 101 on a side of an outer periphery of the level difference part 102 (the support surface 10F).

In the meanwhile, as illustrated in FIG. 9 and FIG. 10, the high voltage side dielectric film 2 has a circular shape with the power supply body arrangement concave part 28 in a center thereof in a plan view. A peripheral surface region 27 is provided to have an annular shape around the power supply body arrangement concave part 28. The high voltage side dielectric film 2 includes a circular concave part bottom surface 26 in a plan view, and a bottom surface around the concave part bottom surface 26 serves as an annular convex part bottom surface 23.

As illustrated in FIG. 13 and FIG. 14, the power supply body 5 has a columnar shape. The power supply body 5 is disposed on the upper surface of the high voltage side dielectric film 2 while a bottom surface of the power supply body 5 is located on the power supply body arrangement concave part 28 of the high voltage side dielectric film 2.

Alternating-current voltage is applied to the power supply body 5 as the first electrode conductive film from the alternating-current power source 15. As illustrated in FIG. 5, the power supply body arrangement concave part 28 includes the power supply body 5 in a plan view, and has a planar shape slightly larger than the power supply body 5.

The high voltage side dielectric film 2 is disposed on the dielectric film support member 10 while the support surface 10F of the dielectric film support member 10 and the convex part bottom surface 23 of the high voltage side dielectric film 2 have contact with each other. The high voltage side dielectric film 2 and the dielectric film support member 10 have contact with each other via a seal member such as an O ring not shown in the diagrams.

As illustrated in FIG. 26 and FIG. 27, the dielectric film suppression member 11 has a circular shape having a center opening part 110 in a center thereof in a plan view. An annular lower surface region provided on a side of an outer periphery of the center opening part 110 serves as the dielectric non-contact region 111, and an annular lower surface region provided on a side of an outer periphery of the dielectric non-contact region 111 serves as the dielectric contact region 112.

As illustrated in FIG. 28, the dielectric contact region 112 protrudes to a lower side of the dielectric non-contact region 111 (−Z direction), and has a contact relationship with an upper surface U2 of the high voltage side dielectric film 2. In the meanwhile, a gap SP11 is located between the dielectric non-contact region 111 and the upper surface U2 of the high voltage side dielectric film 2, thus the dielectric non-contact region 111 does not have contact with the upper surface U2 of the high voltage side dielectric film 2.

As illustrated in FIG. 29 and FIG. 30, the press member 12 has a circular shape having a center opening part 120 in a center thereof in a plan view. A plurality of inner through ports 121*h* are dispersedly disposed to have a circular shape in an outer peripheral region 125 on a side of an outer periphery of the center opening part 120, and a plurality of outer through ports 122*h* are dispersedly disposed to have a circular shape on a side of an outer periphery of the plurality of inner through ports 121*h*.

In this manner, the plurality of inner through ports 121*h* and the plurality of outer through ports 122*h* are provided in the outer peripheral region 125 of the press member 12. Each of the plurality of inner through ports 121*h* is a through port made by cutting a tap.

A part of the outer peripheral region 125 in the press member 12 having the above structure is disposed on the dielectric film support member 10, and the dielectric film support member 10 and the press member 12 are fixed to the chassis bottom part 1*a* of the chassis 1 by the plurality of attachment bolts 31. A screw part of each of the plurality of attachment bolts 31 passes through the plurality of outer through ports 122*h* and the plurality of through ports 10*h*, and is attached to the chassis bottom part 1*a*.

As illustrated in FIG. 2 to FIG. 6, the press member 12 is disposed in a region overlapped with the dielectric film support member 10 and the dielectric film suppression member 11 in a plan view.

In the meanwhile, a plurality of suppression auxiliary members 32 are attached to the press member 12 while passing through the plurality of inner through ports 121*h* of the press member 12. A bolt or a locking screw is considered as the suppression auxiliary member 32. The plurality of suppression auxiliary members 32 attach the dielectric film suppression member 11 to an inner side of the plurality of inner through ports 121*h* while pressing the dielectric film suppression member 11. The plurality of suppression auxiliary members 32 are provided in positions overlapped with the dielectric contact region 112 of the dielectric film suppression member 11 and the convex part bottom surface 23 of the high voltage side dielectric film 2 in a plan view.

Accordingly, the high voltage side dielectric film 2 is suppressed from the dielectric contact region 112 on an outer side by the dielectric film suppression member 11 receiving suppress strength of the plurality of suppression auxiliary members 32.

As described above, in the electrode unit 50 of the active gas generation apparatus 71 according to the embodiment 1, the high voltage side dielectric film 2 as the first electrode dielectric film is suppressed from the dielectric contact region 112 on the upper side by the dielectric film suppression member 11 receiving suppress strength of the plurality of suppression auxiliary members 32. Thus, a region in which load is applied to the high voltage side dielectric film 2 by the dielectric film suppression member 11 can be limited to a lower region of the dielectric contact region 112.

As a result, the active gas generation apparatus 71 according to the embodiment 1 can stably fix the high voltage side dielectric film 2 between the dielectric contact region 112 of the dielectric film suppression member 11 and the support surface 10F of the dielectric film support member 10 without unnecessary bending stress applied to the high voltage side dielectric film 2.

The dielectric film suppression member 11 is set to have ground potential as reference potential, and has conductivity. The dielectric non-contact region 111 of the dielectric film suppression member 11 is overlapped with the intermediate region of the high voltage side dielectric film 2 in a plan view.

Accordingly, the electrode unit 50 can reduce electrical field strength of the power supply body 5 by the dielectric film suppression member 11 including the dielectric non-contact region 111 to reduce potential of the intermediate region of the high voltage side dielectric film 2, thus potential of the high voltage side dielectric film 2 and the ground side dielectric film 3 in an outer diameter direction can be reduced.

As a result, the electrode unit 50 in the active gas generation apparatus 71 according to the embodiment 1 can reliably prevent insulation breakdown in a gap 20 between the high voltage side dielectric film 2 and the dielectric film support member 10.

(Ground Conductor 6)

As illustrated in FIG. 15 to FIG. 17, the ground conductor 6 housed in the conductor housing space 6S in the chassis 1 has a circular shape in a plan view, and includes the material gas buffer space 61 and the slit space 62 in an end portion region in the bottom surface.

The material gas buffer space 61 is formed into an annular shape in a plan view, and is connected to the gas flow path 21 as illustrated in FIG. 2, thus can take the material gas G1 supplied from an outer portion in the material gas buffer space 61 via the gas flow path 21.

The plurality of slit spaces 62 are dispersedly provided around the material gas buffer space 61. As illustrated in FIG. 17, each of the plurality of slit spaces 62 is connected to the material gas buffer space 61, and the material gas G1 can flow from the material gas buffer space 61 to the slit space 62.

As illustrated in FIG. 6 and FIG. 17, the side surface space 63 is a gap space between an inner peripheral side surface of the conductor housing space 6S and an outer peripheral side surface of the ground conductor 6, and is annularly provided in a plan view.

The dielectric film support member 10 and the ground conductor 6 have a positional relationship as illustrated in FIG. 3 and FIG. 4, thus the material gas G1 passing through the side surface space 63 is supplied to a lower side surface region R10 in the dielectric film support member 10.

In this manner, the material gas buffer space 61 is provided on the side of the lower surface of the ground conductor 6 to receive the material gas G1 through the gas flow path 21. Each of the plurality of slit spaces 62 is provided on the side of the lower surface of the ground conductor 6, and is connected to the material gas buffer space 61.

The side surface space 63 is provided on a side of the side surface of the ground conductor 6, and is connected to the plurality of slit spaces. As described above, the material gas flow space includes the material gas buffer space 61, the plurality of slit spaces 62, and the side surface space 63.

Accordingly, the material gas G1 supplied to the gas flow path 21 from the outer portion is introduced into the discharge space 4 through the material gas buffer space 61, the slit space 62, and the side surface space 63.

Each of the plurality of slit spaces 62 is set to be a narrow space in which material gas hardly flows compared with the material gas buffer space 61 so that the material gas G1 temporarily remains in the material gas buffer space 61, and then flows into each of the plurality of slit spaces 62. That is to say, the plurality of slit spaces 62 are set to have small conductance as a coefficient expressing a degree of flowability of the material gas G1 compared with the material gas buffer space 61 and the side surface space 63.

As a result, the active gas generation apparatus 71 according to the embodiment 1 can uniformly supply the material gas G1 spatially to the discharge space 4. That is to say, the material gas G1 is uniformly supplied from a peripheral part of the circular dielectric space 18 toward the discharge space 4 in the center in a plan view.

The conductance of the slit space 62 is set to be small, thus differential pressure between the material gas buffer space 61 and the side surface space 63 increases, and fluctuation of a flow amount of the material gas G1 flowing in each of the plurality of slit spaces 62 is reduced. Accordingly, the material gas G1 is uniformly supplied toward the discharge space 4. A flow amount of the material gas G1 is adjusted by a mass flow controller (MFC) provided on an upstream of the gas flow path 21, for example.

When the material gas G1 is not uniformly supplied in a general active gas generation apparatus, a time of the material gas G1 passing through the discharge space 4 is changed, and as a result, a failure of deterioration of generation efficiency of the active gas G2 occurs. The active gas generation apparatus 71 according to the embodiment 1 can uniformly supply the material gas G1, thus the failure described above does not occur.

(Ground Side Electrode Constituting Part E2 and Active Gas Buffer Space 68)

As described above, the ground side electrode constituting part E2 as the second electrode constituting part includes the ground side dielectric film 3 and the conductive film 7.

As illustrated in FIG. 11 and FIG. 12, the ground side dielectric film 3 has a circular shape in a plan view, and includes the circular dielectric through port 3*h* in the center thereof.

As illustrated in FIG. 18 and FIG. 19, the cover dielectric film 8 has a circular shape in a plan view, and includes a circular cover through port 8*h* in the center thereof. It is preferable that the same constituent material is used for the cover dielectric film 8 and the ground side dielectric film 3. The reason is that occurrence of distortion is prevented in a case where a thermal expansion coefficient is different between the cover dielectric film 8 and the ground side dielectric film 3. It is also applicable to select a material having a close thermal expansion coefficient as a material of each of the cover dielectric film 8 and the ground side dielectric film 3.

As illustrated in FIG. 20 and FIG. 21, the conductive film 7 has a circular shape in a plan view, and includes the circular conductive film opening part 7 in the center thereof in a plan view.

Each of the dielectric through port 3*h* and the conductive film opening part 7*h* is overlapped with an active gas buffer space 68 in a plan view, and as illustrated in FIG. 21, the conductive film opening part 7*h* includes the dielectric through port 3*h* and has a shape larger than the dielectric through port 3*h* in a plan view.

The conductive film 7 is provided on the lower surface of the ground side dielectric film 3 while a center position of each of the ground side dielectric film 3 and the conductive film 7 coincides with each other. A diameter of the conductive film 7 is set to be substantially the same as that of the ground side dielectric film 3, however, a formation area of the conductive film 7 is smaller than that of the ground side dielectric film 3 by reason that the conductive film opening part 7*h* larger than the dielectric through port 3*h* is provided in the center thereof.

A conductive film inner boundary 7*e* as a circumferential outer peripheral line of the conductive film opening part 7*h* serves as an end portion of the conductive film 7 on a side of the dielectric through port 3*h*, and the conductive film 7 is not formed in a region on an inner side of the conductive film inner boundary 7*e*. The conductive film inner boundary 7*e* serves as an electrode boundary line of the conductive film 7. Accordingly, as illustrated in FIG. 21, a formation region A7 of the conductive film 7 on the lower surface of the ground side dielectric film 3 is a region ranging from a position of an outer periphery of the ground side dielectric film 3 to the conductive film inner boundary 7*e*.

As illustrated in FIG. 20 and FIG. 21, the cover dielectric film 8 is provided to have a circular shape from the lower surface of the ground side dielectric film 3 to the lower surface of the conductive film 7 while including the conductive film inner boundary 7*e*. However, the cover dielectric film 8 includes the cover through port 8*h* in a center thereof. That is to say, there is a dimensional relationship that an outer diameter of the conductive film opening part 7*h* of the conductive film 7 is smaller than that of the cover dielectric film 8.

The cover through port 8*h* has substantially the same shape as the dielectric through port 3*h*, and is included in the conductive film opening part 7*h*, thus has a shape smaller than the conductive film opening part 7*h*. Accordingly, the cover dielectric film 8 covers the conductive film inner boundary 7*e* (electrode boundary line) of the conductive film 7. The lower surface of the conductive film 7 which is not covered by the cover dielectric film 8 and the upper surface of the ground conductor 6 have a contact relationship with each other.

As illustrated in FIG. 15 and FIG. 16, the active gas buffer space 68 provided on the upper portion of the ground conductor 6 has a circular shape in a plan view, and a plurality of gas ejection ports 69 are provided around a bottom surface 65 of the active gas buffer space 68.

FIG. 15 and FIG. 16 also illustrate a formation region of the cover dielectric film 8. As illustrated in FIG. 15 and FIG. 16, an outer peripheral line of the cover dielectric film 8 is substantially the same as that of the active gas buffer space 68.

As illustrated in FIG. 2 and FIG. 16, the shield dielectric film 9 is provided on the bottom surface 65 of the active gas buffer space 68.

As illustrated in FIG. 22 and FIG. 23, the shield dielectric film 9 is formed into a circular shape with a predetermined film thickness in a plan view.

The shield dielectric film 9 is provided on the bottom surface 65 of the active gas buffer space 68 while a center position of each of the active gas buffer space 68 and the shield dielectric film 9 coincides with each other.

As illustrated in FIG. 15 and FIG. 16, the plurality of gas ejection ports 69 are overlapped with the cover dielectric film 8 in a plan view, and are not overlapped with the dielectric through port 3*h* and the cover through port 8*h* in a plan view.

As illustrated in FIG. 16, the plurality of gas ejection ports 69 are provided around the bottom surface 65 of the active gas buffer space 68 to pass through the ground conductor 6. That is to say, the plurality of gas ejection ports 69 are provided in a peripheral region of the shield dielectric film 9 in a plan view.

In the active gas generation apparatus 71 according to the embodiment 1 having such a structure, the material gas G1 is supplied from the outer portion of the metal chassis 2 to the discharge space 4 through the gas flow path 21 and the material gas flow space as described above.

When the material gas G1 is supplied to the discharge space 4 where the dielectric barrier discharge occurs, the material gas G1 is activated to be the active gas G2, and passes through the dielectric through port 3*h* and the cover through port 8*h* to be introduced into the active gas buffer space 68. The active gas G2 entering the active gas buffer space 68 passes through the plurality of gas ejection ports 69 provided in the bottom surface of the active gas buffer space 68 to be supplied to a processing space in a subsequent stage.

In the active gas generation apparatus 71 according to the embodiment 1 having such a configuration, a main dielectric space where the high voltage side dielectric film 2 as the first electrode dielectric film and the ground side dielectric film 3 as the second electrode dielectric film face each other serves as the dielectric space 18. The dielectric space 18 has a circular shape in a plan view. A space where the high voltage side dielectric film 2 and the shield dielectric film 9 face each other is defined as an auxiliary dielectric space. The discharge space 4 includes a main discharge space where the power supply body 5 and the conductive film 7 are overlapped with each other in a plan view in the dielectric space 18.

The high voltage side dielectric film 2 and the ground side dielectric film 3 are disposed to correspond to each other so as to have a constant distance therebetween in a height direction (Z direction), and the main discharge space described above is located in the dielectric space 18 between the high voltage side dielectric film 2 and the ground side dielectric film 3.

The discharge space 4 further includes an auxiliary discharge space 44 made up of the dielectric through port 3*h*, the cover through port 8*h*, and a part of the active gas buffer space 68 on the shield dielectric film 9 in the auxiliary dielectric space described above.

A bottom surface region below the bottom surface 65 of the ground conductor 6 is used as a ground electrode conductive film set to have ground potential, and discharge voltage is applied between the power supply body 5 receiving alternating current voltage from the alternating-current power source 15 and the ground electrode conductive film described above, thus the auxiliary discharge space 44 can be generated.

As described above, the auxiliary discharge space 44 includes the dielectric through port 3*h*, the cover through port 8*h*, and a part of the active gas buffer space 68. In this manner, the discharge space 4 formed in the embodiment 1 includes the main discharge space and the auxiliary discharge space 44 in the dielectric space 18.

In the active gas generation apparatus 71 according to the embodiment 1, a path from the auxiliary discharge space 44 to each of the plurality of gas ejection ports 69 is defined as the active gas flow path.

In the active gas generation apparatus 71 according to the embodiment 1, the auxiliary discharge space 44 as a part of the discharge space 4 includes the dielectric through port 3*h*, the cover through port 8*h*, and a part of the active gas buffer space 68, thus can suppress the active gas flow path from the auxiliary discharge space 44 to the plurality of gas ejection ports 69 to have a minimum necessary volume to suppress a deactivation amount of the active gas G2.

Furthermore, the cover dielectric film 8 in the ground side electrode constituting part E2 of the electrode unit 50 covers the conductive film inner boundary 7*e* as the electrode boundary line of the conductive film 7 in the active gas buffer space 68, and is overlapped with the plurality of gas ejection ports 69 in a plan view, thus can suppress a surface deactivation phenomenon in which the active gas G2 gets dissipated due to collision of the active gas G2 with the conductive film 7.

As a result, the active gas generation apparatus 71 according to the embodiment 1 can supply the high concentration active gas G2 from the plurality of gas ejection ports 69 to the processing space in the subsequent stage.

The electrode unit 50 according to the embodiment 1 has the structure described above, thus only the components (the high voltage side dielectric film 2, the ground side dielectric film 3, the cover dielectric film 8, and the shield dielectric film 9) made up of the dielectric serving as the insulator as the constituent material face the discharge space 4. When a metal material faces discharge, it is easily ionized, and metal ions is included in gas, thus causes contamination. In the meanwhile, even when the dielectric faces discharge, it is not easily ionized, thus can prevent contamination in the gas.

(Chassis Opening Part 41)

As illustrated in FIG. 2, the chassis bottom part 1*a* of the chassis 1 includes a chassis opening part 41. The chassis opening part 41 is provided in a region overlapped with the active gas buffer space 68 in a plan view, and passes through the chassis bottom part 1*a*.

Accordingly, the active gas G2 ejected from the plurality of gas ejection ports 69 is introduced into the processing space on the lower side through the chassis opening part 41.

As illustrated in FIG. 2, the chassis opening part 41 provided in the chassis bottom part 1*a* has a larger opening area with decreasing distance to the lower side, and has a tapered shape with a lowermost outer peripheral edge 41L as illustrated in FIG. 2 and FIG. 7.

In the active gas generation apparatus 71 according to the embodiment 1, the chassis opening part 41 provided in the chassis bottom part 1*a* of the chassis 1 has the tapered shape with the larger opening area with decreasing distance to the lower side.

Accordingly, the active gas generation apparatus 71 according to the embodiment 1 can suppress loss of the active gas G2 ejected from the plurality of gas ejection ports 69 due to collision of the active gas G2 with the chassis bottom part 1*a* to a minimum, thus can supply the high concentration active gas G2 to the processing space on the lower side.

Embodiment 2

Figure 31:
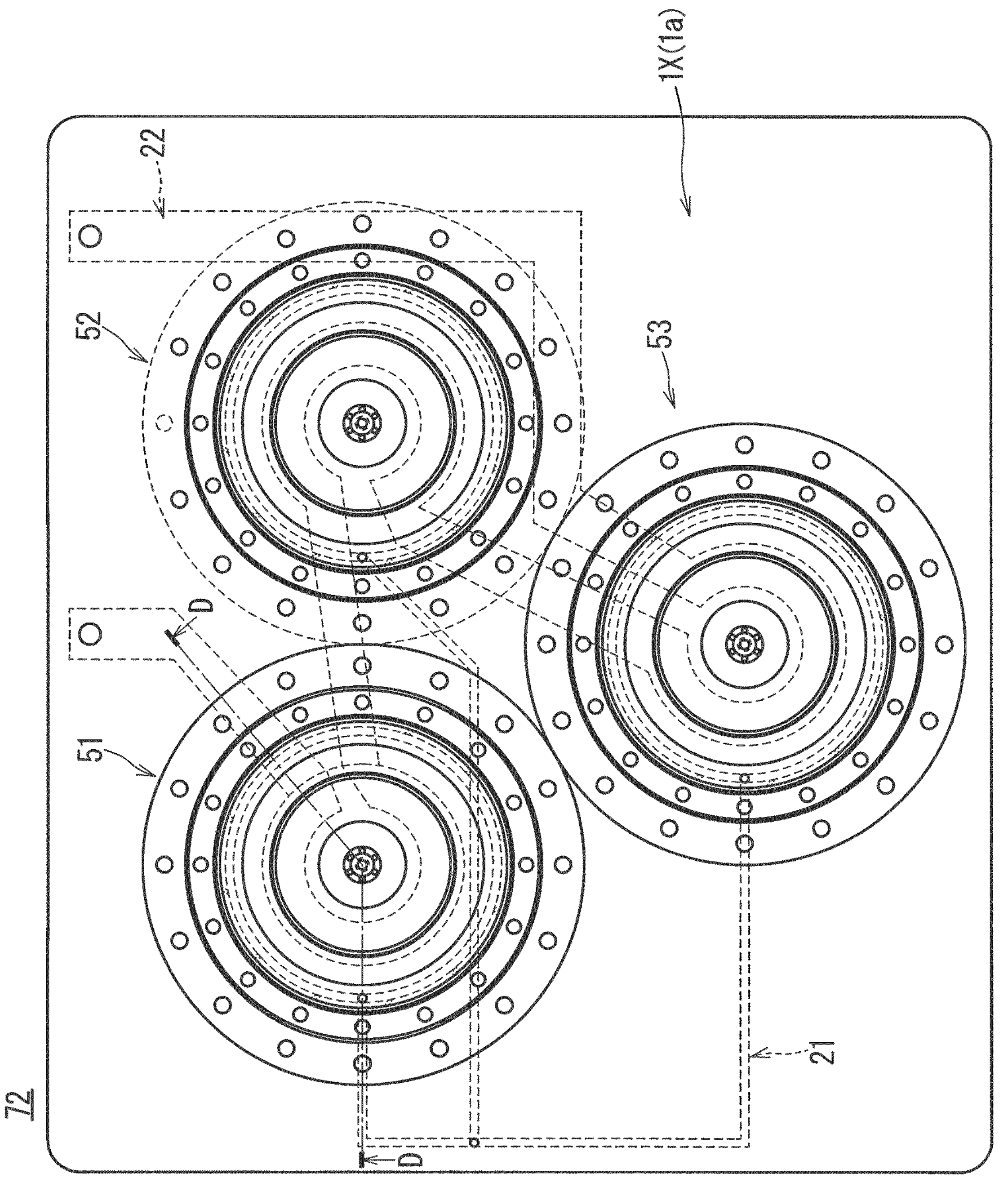
FIG. 31 A plan view schematically illustrating a planar structure of an active gas generation apparatus as an embodiment 2 according to the present disclosure.
Figure 32:
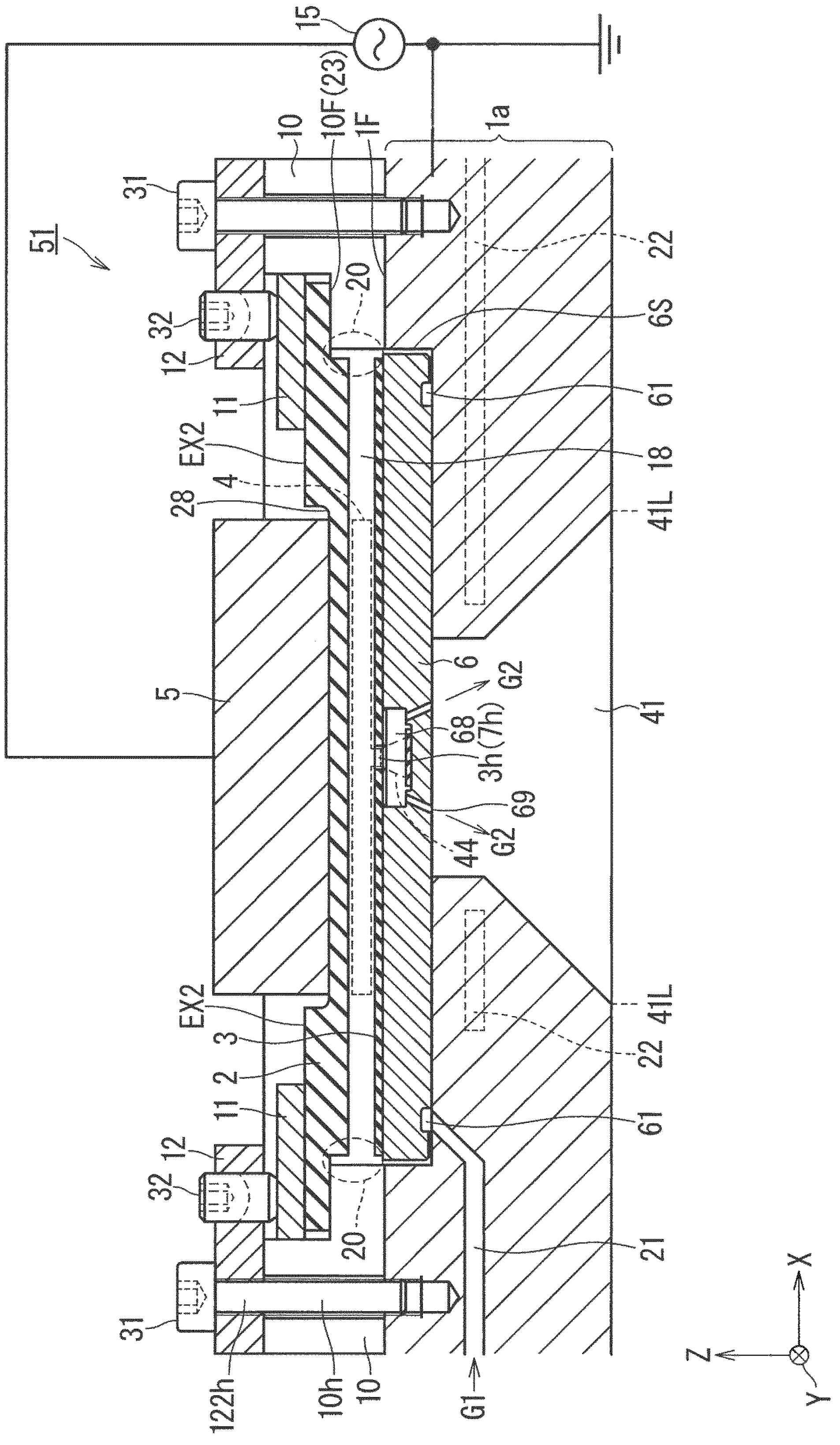
FIG. 32 A cross-sectional view illustrating a cross-section structure of a D-D cross section in FIG. 31.

FIG. 31 is a plan view schematically illustrating a planar structure of an active gas generation apparatus 72 as an embodiment 2 according to the present disclosure. FIG. 32 is a cross-sectional view illustrating a cross-section structure of a D-D cross section in FIG. 31.

The same sign is assigned to the same constituent parts as those in the active gas generation apparatus 71 according to the embodiment 1 illustrated in FIG. 1 to FIG. 30, and characterizing portions of the active gas generation apparatus 72 according to the embodiment 2 is mainly described hereinafter.

In the active gas generation apparatus 72 according to the embodiment 2, three electrode units 51 to 53 as the plurality of electrode units are housed in the chassis space S1 in a chassis 1X. Material gas G1 is supplied to each of the electrode units 51 to 53 through the gas flow path 21.

A cooling path in which a cooling medium flows is further provided in addition to the gas flow path 21 in the chassis bottom part 1*a* of the chassis 1X in the active gas generation apparatus 72. As illustrated in FIG. 31 and FIG. 32, the cooling path 22 is provided on the lower side of the ground conductor 6 of each of the electrode units 51 to 53. That is to say, the cooling path 22 and the ground conductor 6 of each of the electrode units 51 to 53 are overlapped with each other in a plan view.

The active gas generation apparatus 72 according to the embodiment 2 having the configuration describe above has an effect described hereinafter in addition to the effect in the embodiment 1.

In the active gas generation apparatus 72 according to the embodiment 2, the chassis bottom part 1*a* of the chassis 1X includes the cooling path 22 in which the cooling medium flows, thus the ground conductor 6 of each of the electrode units 51 to 53 and the ground side dielectric film 3 disposed on the upper side of the ground conductor 6 can be cooled.

Accordingly, heat generated by dielectric barrier discharge in the discharge space 4 can be removed by the ground side dielectric film 3 which has been cooled. As a result, the active gas generation apparatus 72 according to the embodiment 2 can perform discharge at high power in each of the electrode units 51 to 53, thus can achieve a high concentration of the active gas G2.

Embodiment 3

Figure 33:
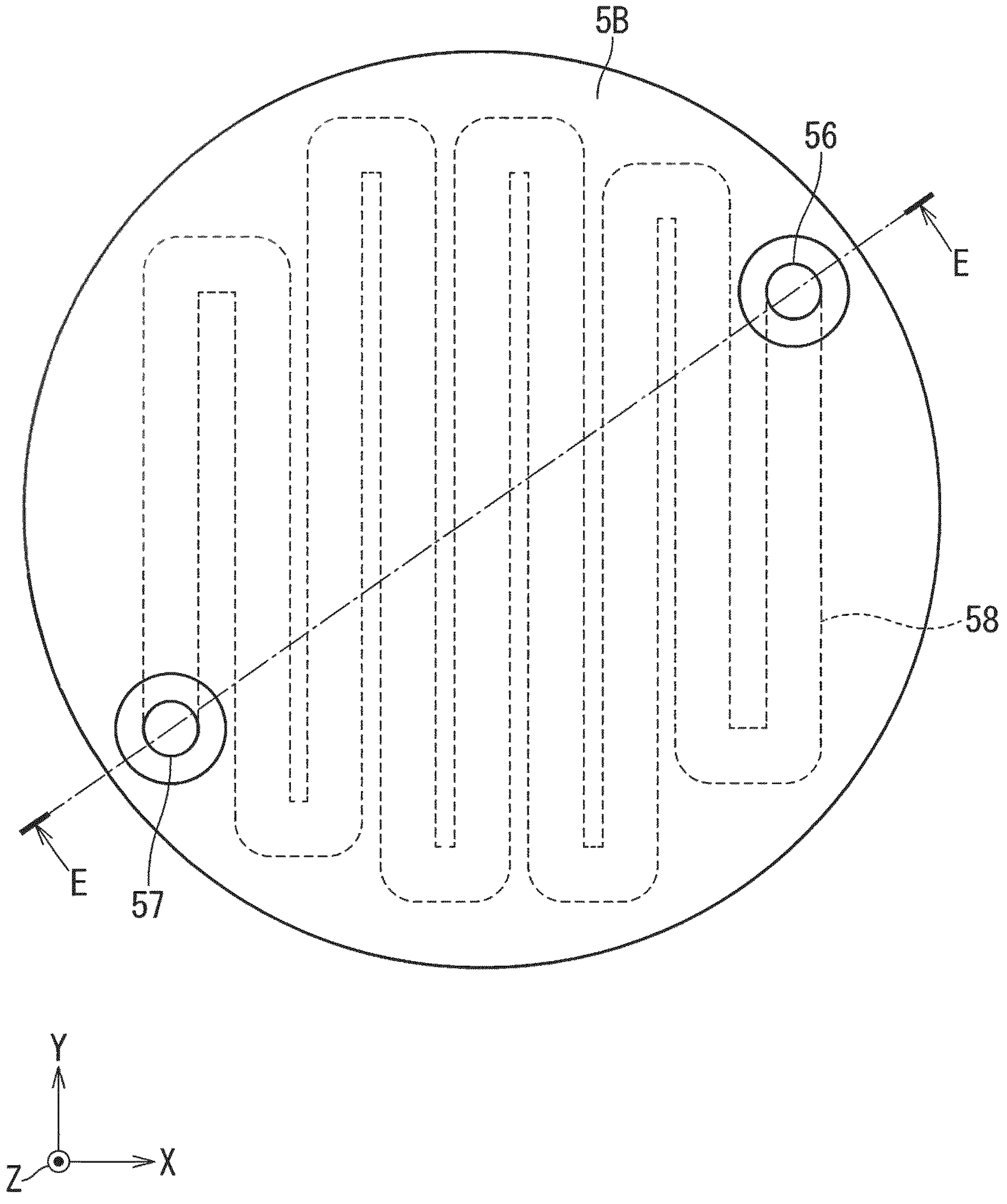
FIG. 33 An explanation diagram schematically illustrating a planar structure of a power supply body used in an electrode unit in an active gas generation apparatus according to an embodiment 3.
Figure 34:
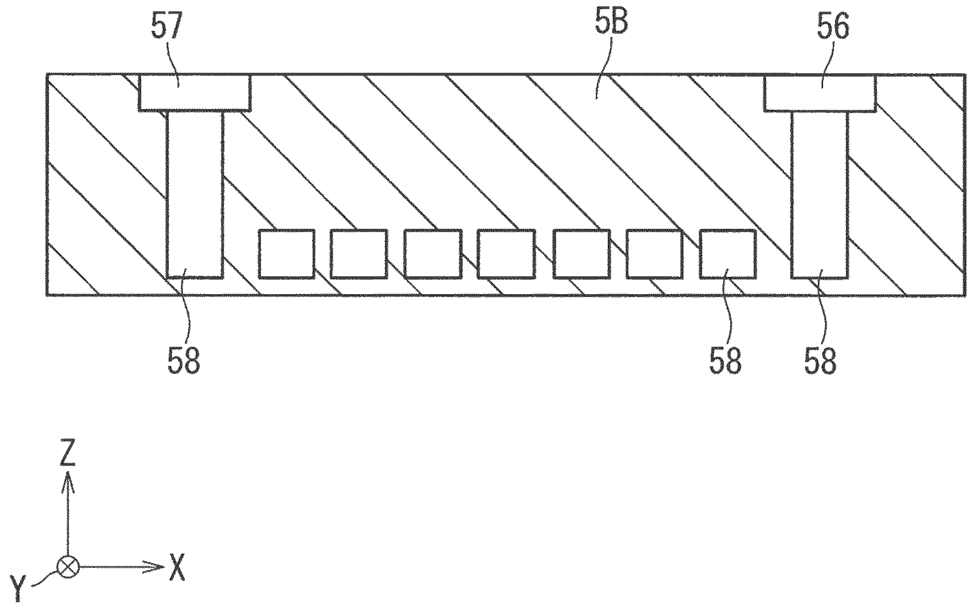
FIG. 34 An explanation diagram illustrating a cross-section structure of an E-E cross section in FIG. 33.

FIG. 33 and FIG. 34 are explanation diagrams each illustrating a structure of a power supply body 5B used in each of the electrode units 51 to 53 in an active gas generation apparatus 73 according to an embodiment 3. FIG. 33 illustrates a planar structure of the power supply body 5B, and FIG. 34 illustrates a cross-section structure of an E-E cross section in FIG. 33.

The active gas generation apparatus 73 according to the embodiment 3 has a feature that the power supply body 5 is replaced with the power supply body 5B in comparison with the embodiment 1. Accordingly, a whole structure of the active gas generation apparatus 73 and a whole structure of the electrode unit 50 (51 to 53) are similar to the structure according to the embodiment 1 illustrated in FIG. 1 to FIG. 30 or the embodiment 2 illustrated in FIG. 31 and FIG. 32.

At this time, a lower surface of the power supply body 5B in the electrode unit 50 and the upper surface of the high voltage side dielectric film 2 have a contact relationship with each other via a solution having conductivity. "Galinstan" (registered trademark) is considered as such a solution, for example.

The same sign is assigned to the same constituent parts as those in the active gas generation apparatus 71 according to the embodiment 1, and characterizing portions of the active gas generation apparatus 73 according to the embodiment 3 is mainly described hereinafter.

The power supply body 5B as the first electrode conductive film includes a cooling medium flow path 58 flowing a cooling medium into an inner portion of the power supply body 5B. As illustrated in FIG. 33 and FIG. 34, the cooling medium flow path 58 is provided in a major part of a region of the power supply body 5B while meandering in a plan view to flow the cooling medium into the whole power supply body 5B.

The power supply body 5B includes, in a surface thereof, a cooling medium inlet 56 for receiving the cooling medium from the outer portion and supply the cooling medium to the cooling medium flow path 58 and a cooling medium outlet 57 for exhausting the cooling medium flowing in the cooling medium flow path 58 to the outer portion.

Figure 35:
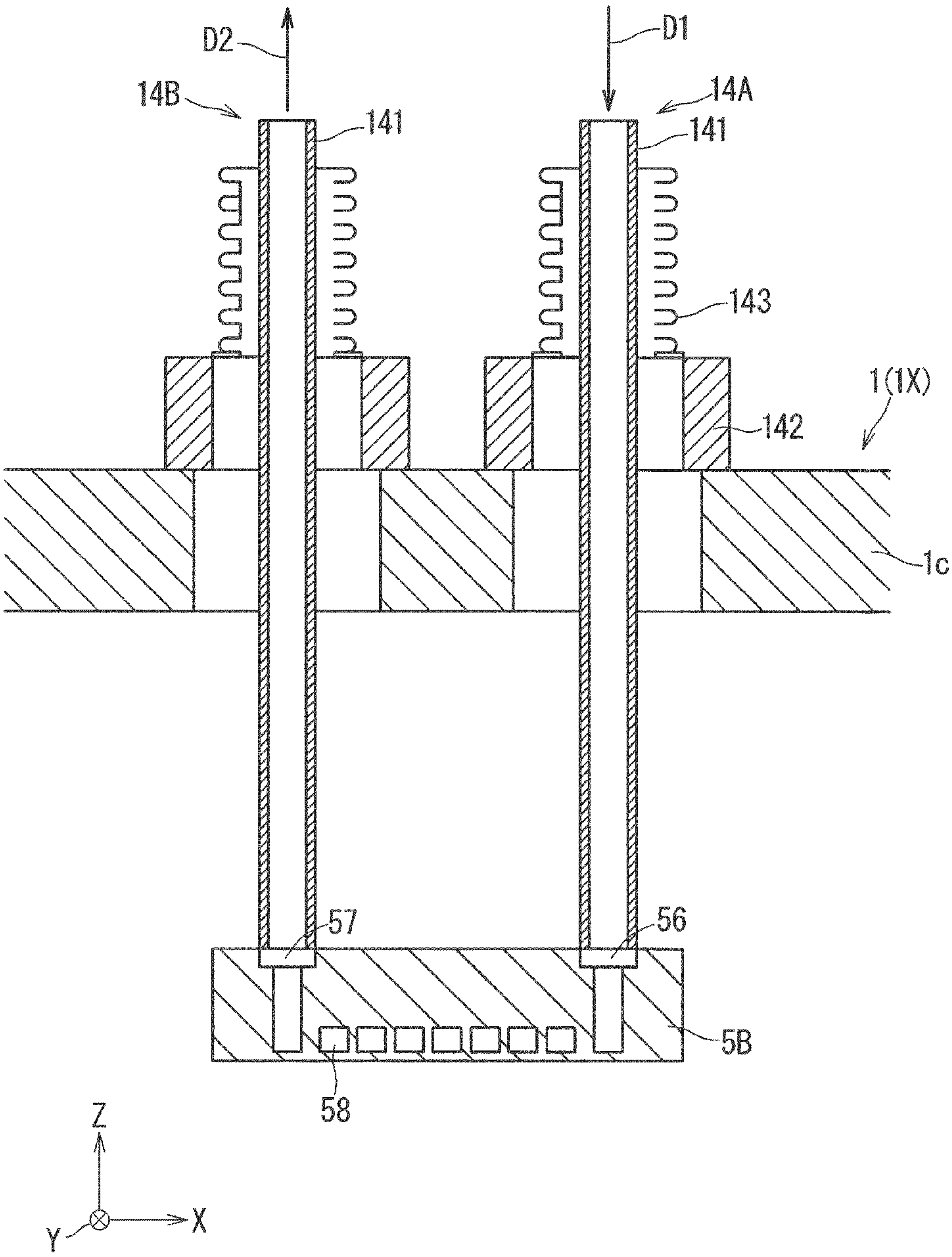
FIG. 35 An explanation diagram schematically illustrating a cooling function in a basic configuration according to the embodiment 3.

FIG. 35 is an explanation diagram schematically illustrating a cooling structure in a basic configuration according to the embodiment 3. As illustrated in FIG. 35, the cooling medium is supplied from the outer portion along a flow D1, and is exhausted to the outer portion along a flow D2 of the cooling medium. As illustrated in FIG. 35, a cooling function is achieved by current introduction members 14A and 14B and the power supply body 5B.

In the basic configuration of the embodiment 3, the cooling structure illustrated in FIG. 35 is provided in each of the electrode units 51 to 53 as the plurality of electrode units.

As illustrated in FIG. 35, the current introduction members 14A and 14B are provided to pass through the chassis upper part 1*c* of the chassis 1 (1X). The current introduction members 14A and 14B serving as first and second current introduction members have the same structure. The current introduction member 14A in the current introduction members 14A and 14B is representatively described hereinafter.

The current introduction member 14A includes a conduction pipe 141, a flange 142, and an insulator 143 as main constituent elements. The conduction pipe 141 and the flange 142 have conductivity, and the insulator 143 has an insulation property.

The conduction pipe 141 is used as an electrical connection means of electrically connecting the alternating-current power source 15 and the power supply body 5B, and further includes a through port through which the cooling medium can be transported.

In the current introduction member 14A, the conduction pipe 141 and the insulator 143 are joined, the flange 142 and the insulator 143 are joined, thus the conduction pipe 141, the flange 142, and the insulator 143 have an integrated structure. However, the insulator 143 is provided between the conduction pipe 141 and the flange 142, thus an electrical connection between the conduction pipe 141 and the flange 142 is prevented.

Each of the current introduction members 14A and 14B are fixed to the chassis upper part 1*c* of the chassis 1X by the flange 142.

The current introduction member 14A as the first current introduction member has an electrical connection relationship with the power supply body 5B, and is connected to the power supply body 5B so that the cooling medium can be supplied from the cooling medium inlet 56 to the cooling medium flow path 58 through the conduction pipe 141. That is to say, the current introduction member 14A is electrically connected to the power supply body 5B by the conduction pipe 141, and the cooling medium flowing in the conduction pipe 141 is supplied from the cooling medium inlet 56 to the cooling medium flow path 58.

The current introduction member 14B as the second current introduction member has an electrical connection relationship with the power supply body 5B, and is connected to the power supply body 5B so that the cooling medium can be exhausted to the outer portion from the cooling medium outlet 57 through the conduction pipe 141. That is to say, the current introduction member 14B is electrically connected to the power supply body 5B by the conduction pipe 141, and the cooling medium flowing in the conduction pipe 141 is supplied to the outer portion.

Joining by welding or connection via a joint, for example, is adopted as a means of connecting the conduction pipe 141 and the power supply body 5B in each of the current introduction members 14A and 14B.

The active gas generation apparatus 73 as the basic configuration according to the embodiment 3 having the configuration describe above has an effect described hereinafter in addition to the effect in the embodiment 1.

In the active gas generation apparatus 73 according to the embodiment 3, the power supply body 5B includes the cooling medium flow path 58 therein, thus when the cooling medium supplied from the cooling medium inlet 56 flows into the cooling medium flow path 58 and is then exhausted to the outer portion from the cooling outlet 57, the power supply body 5B and the high voltage side dielectric film 2 provided on the lower side of the power supply body 5B can be cooled.

The current introduction members 14A and 14B further include the cooling structure of circulating the cooling medium to the cooling medium flow path 58 of the power supply body 5B in addition to the current introduction function of providing the alternating-current voltage from the alternating-current power source 15 to the power supply body 5B, thus can cool each of the current introduction members 14A and 14B while reducing the number of components to a minimum necessary.

Allowable current of the current introduction members 14A and 14B is generally determined by an allowable temperature of the current introduction members 14A and 14B, thus the allowable current can be significantly increased even in the current introduction members 14A and 14B in which the conduction pipe 141 made up of a thin conductor is used by the configuration capable of cooling the current introduction members 14A and 14B themselves.

Furthermore, the solution having conductivity is provided between the high voltage side dielectric film 2 and the power supply body 5B, thus thermal conductivity between the power supply body 5B and the high voltage side dielectric film 2 can be increased, and a problem that a minute gap occurs between the power supply body 5B and the high voltage side dielectric film 2 due to a tolerance or surface roughness in processing can be resolved.

According to the effect described above, each of the electrode units 51 to 53 in the active gas generation apparatus 71 according to the embodiment 3 can perform discharge at high power, and a high concentration of the active gas G2 can be achieved.

Modification Example

Figure 36:
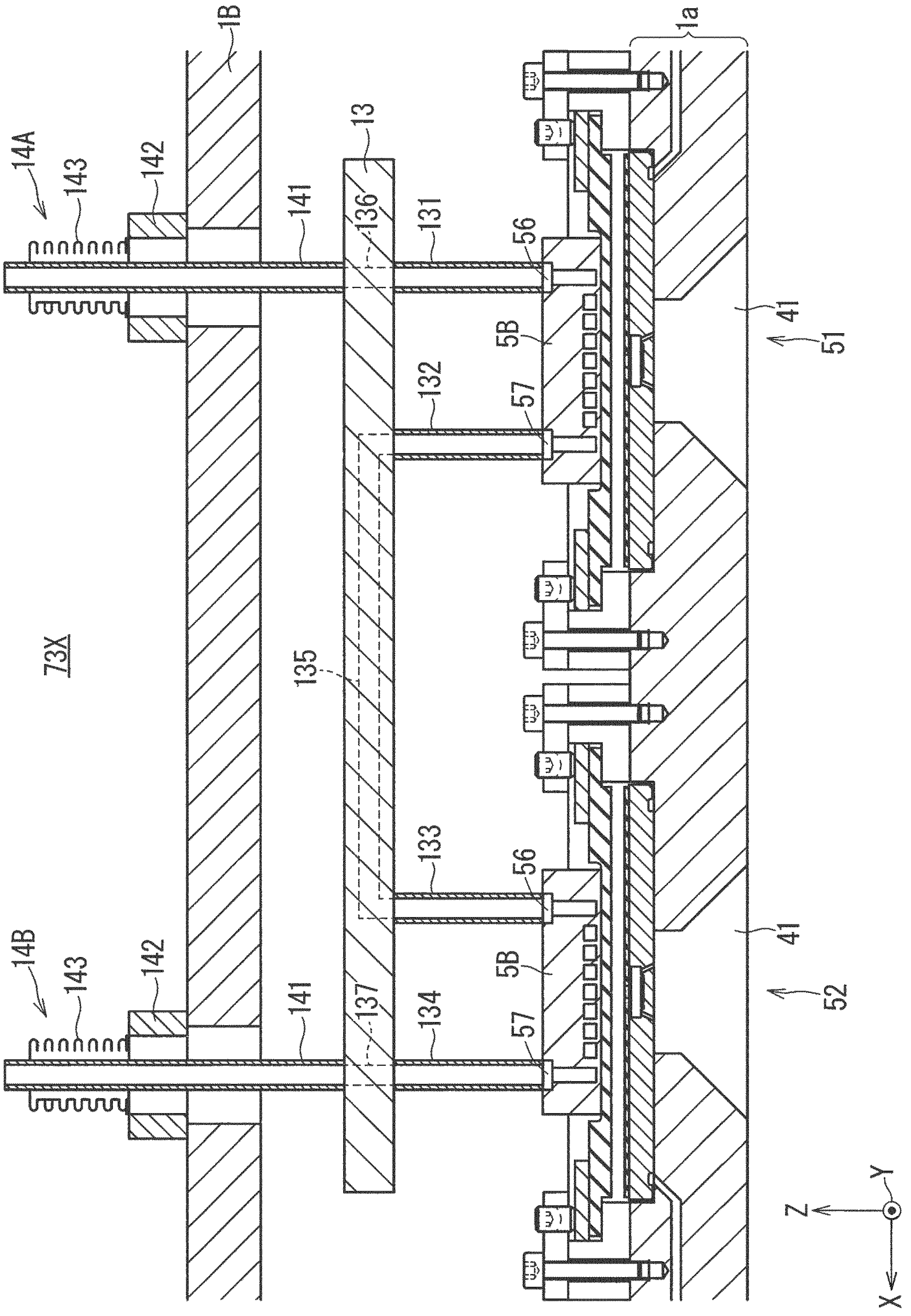
FIG. 36 An explanation diagram schematically illustrating a cooling function in a modification example according to the embodiment 3.

FIG. 36 is an explanation diagram schematically illustrating a cooling structure in an active gas generation apparatus 73X as a modification example of the embodiment 3.

FIG. 36 illustrates the electrode units 51 and 52 as the first and second electrode units. The same sign is assigned to the same constituent parts as those in the active gas generation apparatus 71 according to the embodiment 1 and the active gas generation apparatus 73 as the basic configuration of the embodiment 3, and characterizing portions of the active gas generation apparatus 73X as the modification example of the embodiment 3 is mainly described hereinafter.

In the description hereinafter, the cooling medium flow path 58, the cooling medium inlet 56, and the cooling medium outlet 57 of the power supply body 5 in the electrode unit 51 as the first electrode unit are defined as the first cooling medium flow path, the first cooling medium inlet, and the first cooling medium outlet, respectively, for convenience of explanation.

In the similar manner, the cooling medium flow path 58, the cooling medium inlet 56, and the cooling medium outlet 57 in the electrode unit 52 as the second electrode unit are defined as the second cooling medium flow path, the second cooling medium inlet, and the second cooling medium outlet, respectively.

As illustrated in FIG. 36, a buffer conductor 13 and relay conduction pipes 131 to 134 are added as new constituent elements in the active gas generation apparatus 73X of the modification example. The buffer conductor 13 serves as a cooling medium relay member, and the relay conduction pipes 131 to 134 serve as first to fourth relay conduction pipes.

The buffer conductor 13 as the cooling medium member has conductivity, and includes a relay cooling medium flow path 135 provided in an inner portion and through flow paths 136 and 137 as first and second through flow paths each provided to pass through a lower surface from an upper surface of the buffer conductor 13.

The relay conduction pipes 131 to 134 as the first to fourth relay conduction pipes have conductivity and also have a cooling medium transportation function.

It is preferable that a part of each of the relay conduction pipes 131 to 134 has an accordion shape. The part of each of the relay conduction pipes 131 to 134 preferably has the accordion shape by reason that a deviation of a distance from the buffer conductor 13 to the upper surface of the power supply body 5B caused by a tolerance of components is absorbed, that is to say, a tolerance in manufacturing the active gas generation apparatus 73X is absorbed.

The tolerance described above is obtained by integrating not only a tolerance of lengths of the relay conduction pipes 131 to 134 but also a tolerance of a height of the power supply body 5B and a tolerance of a thickness of the high voltage side dielectric film 2 located on the lower portion of the power supply body 5B, for example.

The relay conduction pipes 131 to 134 as the first to fourth relay conduction pipes are disposed between the buffer conductor 131 as the cooling medium relay member and the power supply body 5B of each of the electrode units 51 and 52 to satisfy first to fourth cooling medium flow conditions described hereinafter.

The first cooling medium flow condition . . . A condition that the cooling medium flows between the conduction pipe 141 of the current introduction member 14A and the first cooling medium inlet through the through flow path 136 and the relay conduction pipe 131.

The second cooling medium flow condition . . . A condition that the cooling medium flows between the first cooling medium outlet and the relay cooling medium flow path 135 through the relay conduction pipe 132.

The third cooling medium flow condition . . . A condition that the cooling medium flows between the relay cooling medium flow path 135 and the second cooling medium inlet through the relay conduction pipe 133.

The fourth cooling medium flow condition . . . A condition that the cooling medium flows between the second cooling medium outlet and the conduction pipe 141 of the current introduction member 14B through the relay conduction pipe 134 and the through flow path 137.

In this manner, the current introduction members 14A and 14B are commonly used in the electrode units 51 and 52 in the active gas generation apparatus 73X as the modification example.

The active gas generation apparatus 73X as the modification example of the embodiment 3 having the configuration describe above has an effect described hereinafter in addition to the effect of the basic configuration in the embodiment 1 and the embodiment 3.

In the active gas generation apparatus 73X as the modification example of the embodiment 3, the relay conduction pipes 131 to 134 are disposed between the buffer conductor 13 and the power supply body 5B of each of the electrode units 51 and 52 so as to satisfy the first to fourth cooling medium flow conditions described above. As a result, the active gas generation apparatus 73X of the modification example can circulate the cooling medium to one loop of the cooling medium to cool the power supply body 5B of the electrode unit 51 and the power supply body 5B of the electrode 52 together.

One loop of the cooling medium includes the current introduction member 14A, the through flow path 136, the relay conduction pipe 131, the first cooling medium inlet, the first cooling medium flow path, the first cooling medium outlet, the relay conduction pipe 132, the relay cooling medium flow path 135, the relay conduction pipe 133, the second cooling medium inlet, the second cooling medium flow path, the second cooling medium outlet, the relay conduction pipe 134, the through flow path 137, and the current introduction member 14B.

As a result, in the active gas generation apparatus 73X of the modification example of the embodiment 3, the power supply body 5B of each of the electrode units 51 and 52 and the high voltage side dielectric film 2 can be cooled with the minimum necessary apparatus configuration that the buffer conductor 13 and the relay conduction pipes 131 to 134 are added without increasing the number of relatively expensive current introduction members 14A and 14B.

The modification example illustrated in FIG. 36 indicates the cooling structure regarding the combination of the electrode units 51 and 52. The cooling structure regarding the combination of the electrode units 51 to 53 can be achieved only by the current introduction members 14A and 14B by expanding the cooling structure of the modification example.

Embodiment 4

Figure 37:
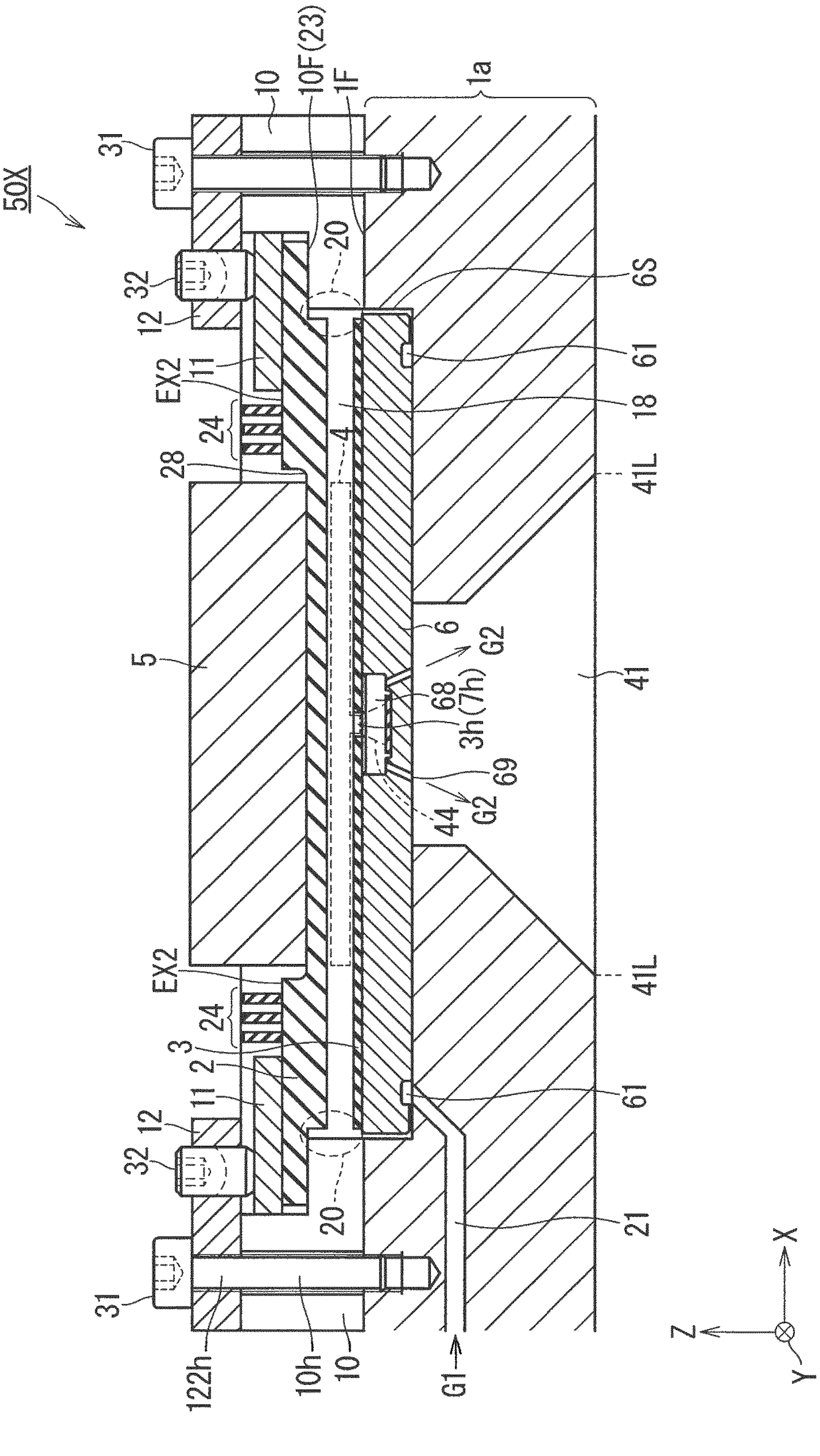
FIG. 37 An explanation diagram illustrating a cross-section structure of an electrode unit in an active gas generation apparatus according to an embodiment 4.

FIG. 37 is an explanation diagram illustrating a cross-section structure of an electrode unit 50X used in an active gas generation apparatus 74 according to the embodiment 4. The electrode unit 50X corresponds to any of the electrode units 51 to 53 described in the embodiment 1. A whole configuration of the active gas generation apparatus 74 is similar to that of the active gas generation apparatus 71 illustrated in FIG. 1.

Figure 38:
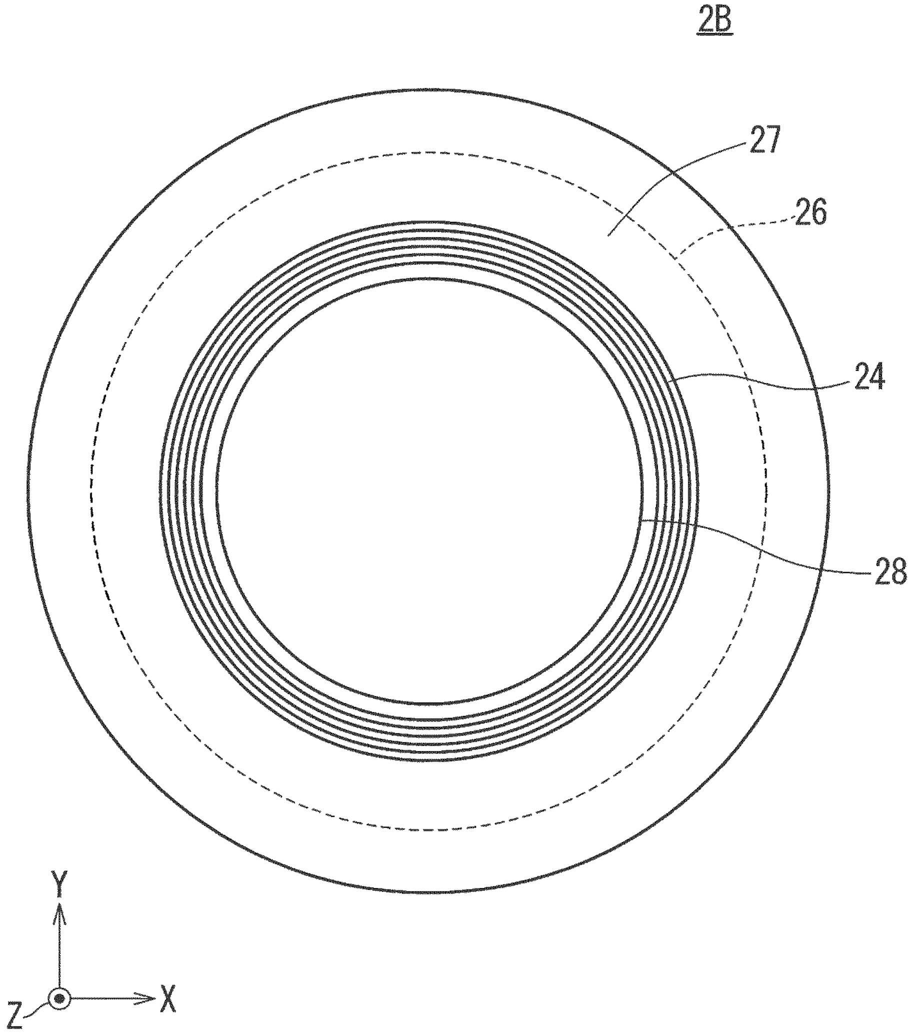
FIG. 38 An explanation diagram schematically illustrating a planar structure of a high voltage side dielectric film illustrated in FIG. 37.
Figure 39:
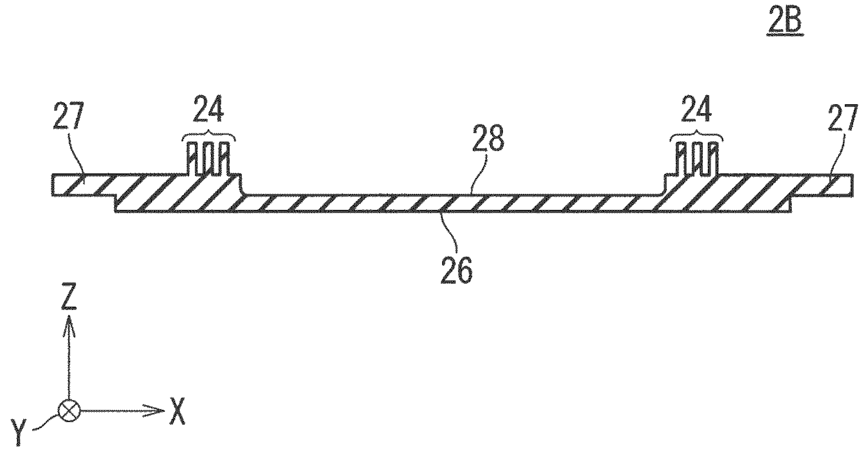
FIG. 39 An explanation diagram schematically illustrating a cross-section structure of the high voltage side dielectric film illustrated in FIG. 37.

FIG. 38 and FIG. 39 are explanation diagrams each schematically illustrating a structure of a high voltage side dielectric film 2B. FIG. 38 illustrates a planar structure of the high voltage side dielectric film 2B, and FIG. 39 illustrates a cross-section structure of the high voltage side dielectric film 2B.

The electrode unit 50X has a feature that the high voltage side dielectric film 2 of the electrode unit 50 according to the embodiment 1 is replaced with the high voltage side dielectric film 2.

The same sign is assigned to the same constituent parts as those in the electrode unit 50 according to the embodiment 1, and characterizing portions of the electrode unit 50X according to the embodiment 4 is mainly described hereinafter.

As illustrated in FIG. 38, the high voltage side dielectric film 2B includes an insulator structure part 24 having a triple circular structure in a plan view on the peripheral surface region 27 around the power supply body arrangement concave part 28. The insulator structure part 24 has a concave-convex structure provided on an upper surface of the high voltage side dielectric film 2B. FIG. 38 illustrates the insulator structure part 24 formed of a dielectric made up of the same constituent material as the high voltage side dielectric film 2B.

As illustrated in FIG. 37, the high voltage side dielectric film 2B in the electrode unit 50X includes the insulator structure part 24 having the concave-convex structure on an upper surface thereof which is not overlapped with the power supply body 5 and the dielectric film suppression member 11 in a plan view. That is to say, in the embodiment 4, the insulator structure part 24 is provided on the upper surface thereof corresponding to the exposed region EX2 of the high voltage side dielectric film 2 according to the embodiment 1 illustrated in FIG. 2, for example. FIG. 37 illustrates the insulator structure part 24 formed of the dielectric.

Accordingly, as illustrated in FIG. 37, the electrode unit 50X according to the embodiment 4 includes the insulator structure part 24 between the dielectric film suppression member 11 and the power supply body 5 on the upper surface of the high voltage side dielectric film 2B.

First and second methods described hereinafter are considered as a method of forming the insulator structure part 24. The first method is a method of performing cutting process on a flat upper surface of a basic structure of the high voltage side dielectric film 2B to manufacture the high voltage side dielectric film 2B selectively including the insulator structure part 24 on the upper surface thereof. In a case of the first method, the insulator structure part 24 is made up of the same constituent material as the high voltage side dielectric film 2B.

The second method is a method of selectively bonding the insulator structure part 24 with an adhesive agent on a flat upper surface of a basic structure of the high voltage side dielectric film 2B after separately manufacturing the insulator structure part 24, thereby manufacturing the high voltage side dielectric film 2B. In a case of the second method, the insulator structure part 24 may be made up of the same constituent material as the high voltage side dielectric film 2B, or may also be made up of a different constituent material.

In the active gas generation apparatus 74 according to the embodiment 4, the high voltage side dielectric film 2B of the electrode unit 50X includes the insulator structure part 24 having the concave-convex structure between the dielectric film suppression member 11 and the power supply body 5 on the upper surface thereof, thus can prevent creeping discharge between the power supply body 5 and the dielectric film suppression member 11.

In the embodiment 4 illustrated in FIG. 37 to FIG. 39, the constituent material of the insulator structure part 24 is the same dielectric as that of the high voltage side dielectric film 2B, however, the insulator structure part 24 may also be formed of a constituent material other than the dielectric different from that of the high voltage side dielectric film 2B.

The present disclosure is described in detail, however, the foregoing description is in all aspects illustrative, thus the present disclosure is not limited thereto. It is therefore understood that numerous modification examples not exemplified can be devised without departing from the scope of the present disclosure.

That is to say, each embodiment can be arbitrarily combined, or each embodiment can be appropriately varied or omitted within a scope of the present disclosure.

The invention claimed is:

1. An active gas generation apparatus activating material gas supplied to a discharge space to generate active gas, comprising:

an electrode unit; and a chassis housing the electrode unit in a chassis space and having conductivity, wherein the chassis includes a chassis bottom part including a flat surface and a conductor housing space concaved from the flat surface in a depth direction, the electrode unit includes:

a first electrode constituting part;

a second electrode constituting part provided on a lower side of the first electrode constituting part; and a reference potential conductor provided on a lower side of the second electrode constituting part and housed in the conductor housing space, the first electrode constituting part includes a first electrode dielectric film and a first electrode conductive film formed on an upper surface of the first electrode dielectric film, the second electrode constituting part includes a second electrode dielectric film and a second electrode conductive film formed on a lower surface of the second electrode dielectric film, the reference potential conductor includes an active gas buffer space on an upper portion, and the second electrode constituting part is disposed to cover the active gas buffer space, the second electrode dielectric film includes a dielectric through port passing through the second electrode dielectric film in a region overlapped with the active gas buffer space in a plan view, the second electrode conductive film includes a conductive film opening part in a region overlapped with the active gas buffer space in a plan view, and the conductive film opening part is overlapped with the dielectric through port in a plan view, the chassis bottom part includes a gas flow path receiving material gas from an outer portion, a material gas flow space is provided between the reference potential conductor and the conductor housing space of the chassis, a space where the first electrode dielectric film and the second electrode dielectric film face each other is defined as a main dielectric space, the discharge space includes a main discharge space as a region in which the first and second electrode conductive films are overlapped with each other in a plan view in the main dielectric space, material gas is introduced into the discharge space via the gas flow path and the material gas flow space, alternating-current voltage is applied to the first electrode conductive film, and the second electrode conductive film is set to have reference potential via the chassis and the reference potential conductor, the active gas generation apparatus further includes:

a dielectric film support member provided on the flat surface of the chassis and including a support surface supporting the first electrode dielectric film from a lower side; and a dielectric film suppression member for suppressing the first electrode dielectric film from an upper side, the dielectric film suppression member not being overlapped with the first electrode conductive film in a plan view, a lower surface of the dielectric film suppression member includes a dielectric contact region having contact with an upper surface of the first electrode dielectric film and a dielectric non-contact region not having contact with an upper surface of the first electrode dielectric film, the dielectric contact region is overlapped with a peripheral region of the first electrode dielectric film and the support surface of the dielectric film support member in a plan view, the dielectric non-contact region is overlapped with an intermediate region of the first electrode dielectric film in a plan view, and the intermediate region is a region adjacent to a side of the first electrode conductive film from the peripheral region, the dielectric film suppression member has conductivity and is set to have the reference potential, and the first electrode dielectric film is suppressed by the dielectric film suppression member from an upper side in the dielectric contact region.

2. The active gas generation apparatus according to claim 1, wherein the material gas flow space includes:

a material gas buffer space provided on a side of a lower surface of the reference potential conductor and receiving material gas through the gas flow path;

a slit space provided on a side of a lower surface of the reference potential conductor and connected to the material gas buffer space; and a side surface space provided on a side of a side surface of the reference potential conductor and connected to the slit space so that material gas is introduced into the discharge space through the material gas buffer space, the slit space, and the side surface space, and the slit space is set to be a space in which material gas hardly flows compared with the material gas buffer space so that material gas temporarily remains in the material gas buffer space, and then flows into the slit space.

3. The active gas generation apparatus according to claim 1, wherein an outer peripheral line of the conductive film opening part of the second electrode conductive film is defined as an electrode boundary line, the second electrode constituting part further includes a cover dielectric film covering the electrode boundary line of the second electrode conductive film in the active gas buffer space, and the cover dielectric film includes a cover through port passing through the cover dielectric film in a region overlapped with the dielectric through port in a plan view, the active gas generation apparatus further includes:

a shield dielectric film provided in a region overlapped with the dielectric through port and the cover through port in a plan view on a bottom surface of the active gas buffer space; and a gas ejection port provided to pass through the reference potential conductor in a peripheral region of the shield dielectric film so that the gas ejection port is overlapped with the cover dielectric film in a plan view and is not overlapped with the dielectric through port and the cover through port in a plan view, the discharge space includes an auxiliary discharge space including the dielectric through port, the cover through port, and a part of the active gas buffer space in addition to the main discharge space, and a path from the auxiliary discharge space to the gas ejection port is defined as an active gas flow path.

4. The active gas generation apparatus according to claim 3, wherein the chassis bottom part of the chassis includes a chassis opening part in a region overlapped with the active gas buffer space in a plan view, and active gas ejected from the gas ejection port is introduced to a lower side through the chassis opening part, and the chassis opening part has a tapered shape with a larger opening area with decreasing distance to a lower side.

5. The active gas generation apparatus according to claim 1, wherein the electrode unit includes a plurality of electrode units, and the chassis bottom part of the chassis includes a cooling path flowing a cooling medium, and the cooling path is provided on a lower side of the reference potential conductor of each of the plurality of electrode units.

6. The active gas generation apparatus according to claim 1, wherein an upper surface of the first electrode dielectric film and a lower surface of the first electrode conductive film have a contact relationship with each other via a solution having conductivity, the first electrode conductive film is a power supply body, the power supply body includes:

a cooling medium flow path provided in an inner portion to flow a cooling medium;

a cooling medium inlet for receiving a cooling medium from an outer portion and supplying the cooling medium to the cooling medium flow path; and a cooling medium outlet for exhausting a cooling medium flowing the cooling medium flow path to an outer portion, the active gas generation apparatus includes:

an alternating-current power source applying the alternating-current voltage; and first and second current introduction members each having conductivity and receiving the alternating-current voltage, each of the first and second current introduction members including a conduction pipe which can transport the cooling medium, the first current introduction member has an electrical connection relationship with the power supply body, and is connected to the power supply body to be able to supply the cooling medium from the cooling medium inlet to the cooling medium flow path through the conduction pipe, and the second current introduction member has an electrical connection relationship with the power supply body, and is connected to the power supply body to be able to exhaust the cooling medium from the cooling medium outlet to an outer portion through the conduction pipe.

7. The active gas generation apparatus according to claim 6, wherein the electrode unit includes first and second electrode units, the cooling medium flow path, the cooling medium inlet, and the cooling medium outlet of the first electrode unit are defined as a first cooling medium flow path, a first cooling medium inlet, and a first cooling medium outlet, respectively, the cooling medium flow path, the cooling medium inlet, and the cooling medium outlet of the second electrode unit are defined as a second cooling medium flow path, a second cooling medium inlet, and a second cooling medium outlet, respectively, the active gas generation apparatus further includes:

a cooling medium relay member having conductivity, and including a relay cooling medium flow path provided in an inner portion and first and second through flow paths each provided to pass through a lower surface from an upper surface of the cooling medium relay member; and first to fourth relay conduction pipes each having conductivity and each having a cooling medium transportation function, the first to fourth relay conduction pipes are disposed between the cooling medium relay member and the power supply body of each of the first and second electrode units to satisfy first to fourth cooling medium flow conditions, the first cooling medium flow condition is a condition that the cooling medium flows between the first current introduction member and the first cooling medium inlet through the first through flow path and the first relay conduction pipe, the second cooling medium flow condition is a condition that the cooling medium flows between the first cooling medium outlet and the relay cooling medium flow path through the second relay conduction pipe, the third cooling medium flow condition is a condition that the cooling medium flows between the relay cooling medium flow path and the second cooling medium inlet through the relay conduction pipe, and the fourth cooling medium flow condition is a condition that the cooling medium flows between the second cooling medium outlet and the second current introduction member through the fourth relay conduction pipe and the second through flow path.

8. The active gas generation apparatus according to claim 6, wherein the first electrode dielectric film has a concave-convex structure on an upper surface which is not overlapped with the power supply body and the dielectric film suppression member in a plan view.

* * * * *